(12) United States Patent
Burckle et al.

(10) Patent No.: US 7,279,103 B2
(45) Date of Patent: Oct. 9, 2007

(54) PROCESS FOR THE PURIFICATION OF ACIDIC METAL-BEARING WASTE WATERS TO PERMISSIBLE DISCHARGE LEVELS WITH RECOVERY OF MARKETABLE METAL PRODUCTS

(75) Inventors: John Burckle, Cincinnati, OH (US); Rakesh Govind, Cincinnati, OH (US); Fred Kawahara, Ft. Wright, KY (US); Richard Scharp, Cincinnati, OH (US); Henry Tabak, Cincinnati, OH (US)

(73) Assignee: United States of America Enviromental Protection Agency, Washington, DC (US)

( * ) Notice: Subject to any disclaimer, the term of this patent is extended or adjusted under 35 U.S.C. 154(b) by 0 days.

(21) Appl. No.: 11/224,039

(22) Filed: Sep. 13, 2005

(65) Prior Publication Data
US 2007/0090057 A1    Apr. 26, 2007

(51) Int. Cl.
*C02F 1/62*   (2006.01)
*C02F 101/20* (2006.01)

(52) U.S. Cl. .............. 210/610; 210/616; 210/631; 210/640; 210/709; 210/716; 210/722; 210/724; 210/726; 210/912

(58) Field of Classification Search ............... 210/716, 210/722
See application file for complete search history.

(56) References Cited

U.S. PATENT DOCUMENTS

| | | | |
|---|---|---|---|
| 3,421,850 A | 1/1969 | Peterson et al. | |
| 3,740,331 A | 6/1973 | Anderson et al. | |
| 3,901,802 A | 8/1975 | Peeters et al. | |
| 4,025,430 A | 5/1977 | Pagel | |
| 4,102,784 A | 7/1978 | Schlauch | |
| 4,170,553 A | 10/1979 | Lang et al. | |
| 4,200,523 A * | 4/1980 | Balmat | 210/611 |

(Continued)

FOREIGN PATENT DOCUMENTS

JP    08057493 A  *  8/1994

(Continued)

OTHER PUBLICATIONS

Govind, R. et al., "Treatment of Acid Mine Drainage in a Membrane Reactor", Inorganic Memebranes, (Jul. 18-22, 2004), pp. 217-277.

(Continued)

*Primary Examiner*—Peter A. Hruskoci
(74) *Attorney, Agent, or Firm*—Browdy & Neimark, PLLC; Anne Kornbau

(57) ABSTRACT

Acidic metal-bearing wastewaters are treated to produce a finished water of sufficient purity to meet discharge standards while recovering metals removed in forms which are commercially valuable. The metals are selectively precipitated, either in a batch or in a continuous system, for removal of individual metal products in a specific sequence of steps from the wastewater. In each step, the pH is adjusted to the specific pH range and sulfide ion is introduced to precipitate the metals, excepting the removal of ferric iron and aluminum which is achieved using hydroxide precipitation. Bioconversion process using unique equipment converts sulfate in the wastewater to the hydrogen sulfide gas required for the precipitation process. This bioconversion process reduces the sulfate in the wastewater so that the water can be directly discharged or used for agricultural applications.

15 Claims, 8 Drawing Sheets

Schematic of the laboratory apparatus used to obtain experimental data for chemical operating regions of the process

U.S. PATENT DOCUMENTS

| | | | |
|---|---|---|---|
| 4,217,209 A | | 8/1980 | Steffan et al. |
| 4,278,539 A | | 7/1981 | Santhanam et al. |
| 4,338,200 A | | 7/1982 | Zeijlstra |
| 4,354,937 A | * | 10/1982 | Hallberg ............... 210/607 |
| 4,422,943 A | | 12/1983 | Fender et al. |
| 4,566,975 A | | 1/1986 | Allgulin |
| 4,680,126 A | | 7/1987 | Frankard et al. |
| 5,009,793 A | | 4/1991 | Muller |
| 5,128,047 A | | 7/1992 | Stewart et al. |
| 5,178,842 A | | 1/1993 | Fugleberg |
| 5,505,857 A | * | 4/1996 | Misra et al. ............. 210/709 |
| 5,554,290 A | * | 9/1996 | Suthersan ............... 210/610 |
| 5,587,079 A | | 12/1996 | Rowley et al. |
| 5,672,280 A | | 9/1997 | Demopoulos et al. |
| 5,976,378 A | * | 11/1999 | Sumino et al. ........... 210/616 |
| 6,007,712 A | * | 12/1999 | Tanaka et al. ........... 210/151 |
| 6,139,753 A | | 10/2000 | Taylor |
| 6,325,923 B1 | * | 12/2001 | Zaluski et al. ........... 210/150 |
| 6,383,506 B1 | * | 5/2002 | Mehta et al. ............. 424/408 |
| 6,387,669 B1 | * | 5/2002 | Truex et al. ............. 435/168 |
| 6,852,305 B2 | | 2/2005 | Buisman et al. |

FOREIGN PATENT DOCUMENTS

WO      WO9508513    *   3/1995

OTHER PUBLICATIONS

Govind, R. et al., "Treatment of Acid Mine Drainage Using Membrane Bioreactors", Proceedings of the Eighth International Conference in Inorganic Membranes, (Jul. 2004), pp. 1-8.

Tabak, H. et al., "Advances in biotreatment of acid mine drainage and biorecvoery of metals: 1. Metal precipitation for recovery and recycle", Biodegradation, (2003), vol. 23, pp. 423-436.

* cited by examiner

Figure 1. Schematic of the laboratory apparatus used to obtain experimental data for chemical operating regions of the process Figure 2. Relationship of pH, Eh, and pS required to control the chemical composition of the iron product formed by precipitation of sulfide Figure 8. Schematic of the Membrane Precipitator System Figure 9 Schematic of the membrane reactor system using hydrogen-consuming sulfate reducing bacterial biofilms outside the membrane hollow fibers.

PROCESS FOR THE PURIFICATION OF ACIDIC METAL-BEARING WASTE WATERS TO PERMISSIBLE DISCHARGE LEVELS WITH RECOVERY OF MARKETABLE METAL PRODUCTS

FIELD OF THE INVENTION

The present invention relates to a process for purifying acidic metal-bearing waste waters to obtain high purity metal sulfides and hydroxides for subsequent processing into high value products and producing product water suitable for discharge into the environment. The metal-bearing acidic waste streams can emanate from abandoned mines, mining operations, industrial processes, metal finishing operations, chemical production, steel processing, or any other waste treatment system. It is flexible in operation and may be operated for the purification of wastewater to remove metals and/or sulfate without metals recovery, or with recovery of only targeted metals, such as copper, zinc, or as a part of a sulfur-recovery process, as desired.

BACKGROUND OF THE INVENTION

Acid mine drainage (AMD) is a common problem for mining industries throughout the world. AMD drainage from metal mining typically contains dissolved metals of high concentration and more than 3 g/L sulfate. The high acidity and presence of these metals make AMD treatment a major concern because of the possible deleterious effects of the effluent on the environment.

There are more than 40,000 remote abandoned mines and a large number of pit lakes in the state of Montana alone. There are many thousands of such mines in other states, including Pennsylvania, Ohio and West Virginia. Acid mine water, upwelling from these remote mines, mainly during the spring season, results in massive destruction of surrounding vegetation. The Berkeley Pit in Butte, Mont., contains 30 billion gallons of acid mind drainage, with daily increases of 3 million gallons per day. This represents a large source of recoverable metals from mine drainage.

Metals are an integral part of the world economy. The residual effects of metals and their use, particularly in aqueous streams, is a continuous problem for metal producers and users, as well as federal and state regulators. Innovating and alternative techniques that allow for the economic control or recovery of metals is one alternative that lends itself not only to human health and environmental protection, but also to resource conservation and reuse of valuable commodities.

Heavy metals can create environmental hazards and are a major pollution (problem for streams that receive acid mine drainage. Metals also appear in wastewaters from metal finishing and metal production facilities, chemical cleaning wastes, as well as ash-pond effluents from coal-fired power plants (Bhattacharyya, 1979).

Treatment of acid mine drainage is a major environmental issue for the mining industries. Old abandoned mines produce acid mine drainage that causes billions of dollars of damage to natural vegetation, lumber trees, rivers, natural habitats and aquatic life. The flow rate of acid water, generated from water introduced by spring thaws and rain, may vary from a few gallons per minute to several thousand gallons per minute. In the U.S., acid mine drainage and other toxins from abandoned mines have polluted 180,000 acres of reservoirs and lakes and 12,000 miles of streams and rivers, (Kleinman, 1989). It has been estimated that cleaning up these polluted waterways would cost U.S. taxpayers between $32 billion and $72 billion. The U.S. Bureau of Mines has estimated that the U.S. mining industry spends over $1 million each day to treat acidic mine water (Pearse, 1996). As noted above, one of the largest locations of acid mine water is the Berkeley Pit in Butte, Mont., encompassing over one square miles in surface area and over 900 feet deep. The water in the Pit has a pH that varies between 2.2 and 2.7. Approximately 3 million gallons of water flow into the Pit daily, resulting in a rise of about 10 feet every nine months.

Many hydrometallurgical processes are based on the solubility behavior of metals in aqueous solutions. Precipitation of metal hydroxides is most easily controlled by pH adjustment and is one of the best known and widely used methods for removing certain metals from impure streams. The conventional approach is to use a base such as lime or sodium hydroxide to raise the pH and precipitate the metals from solution. However, several researchers have used the lower solubilities of metal sulfides to improve metal waste treatment.

Further, sulfide precipitation is becoming more prevalent because lower metal concentrations can be achieved. In many mining operations, however, sulfur compounds may be present, so aqueous metal and sulfide reactions must be considered as well.

The following section mathematically describes the reactions that occur as well as some documented applications of sulfide precipitation reported in the literature.

Monhemius (1977) computed metal concentrations in solution as a function of pH in the presence of hydroxide and sulfide ions using the solubility product of various metal salts.

For hydroxide salts, the pH is important because the hydroxide concentration is limited by the dissociation constant of water, $K_w$. Thus, the concentration of a metal hydroxide in solution can be given as a function of pH.

$$\log\{M^{Y+}\} = \frac{1}{x}\log K_{Sp} - \frac{Y}{x}(pH + \log K_W) \quad (1)$$

Because hydrogen sulfide will dissociate, its solubility can be calculated using the pH, partial pressure, and dissociation constant. Thus, $$\log\{S^{2-}\} = 2\ pH + \log P_{H_2S} + \log K_{PO} \quad (2)$$

A parameter pS can be defined as follows:

$$pS = -\log\{S^{2-}\} \quad (3)$$

Monhemius uses a dissociation reaction of

$$K_{PO} = [H^+]^2 \cdot [S^{2-}] = 1.23 \times 10^{-23} \quad (4)$$

Oxtoby and Nachtrieb (1990) present a second, though similar, way to calculate solubility of metal sulfides. They use the fact that the sulfide ion is highly unstable in solution, and propose the following overall reaction for the dissolution of metal sulfides in solution:

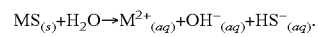

The hydroxide ion concentration in solution is fixed by the pH.

$$K_w = [OH^-][H^+] = 10^{-14} \quad (5)$$

The concentration of the [HS⁻] ion is then computed from the acid ionization of $H_2S$.

$$H_2S_{(aq)} + H_2O \rightarrow H_3O^+_{(aq)} + HS^-_{(aq)}$$

$$K_a = \frac{[H_3O^-][HS^-]}{[H_2S]} = 9.1 \times 10^{-8} \quad (6)$$

The solubility of $H_2S$ in pure water is given by Morse et al. (1987) as $$K_O(\text{mol}/L\text{-atm}) = -41.0563 + 66.4005\left[\frac{1}{7}\right] - 15.1060\ln\left[\frac{1}{7}\right] \quad (7)$$

This assumes a fugacity of $H_2S$ of one atmosphere. The concentration at other fugacities is also given as:

$$C^*(\text{mol}/L) = K_O f_{H_2S} \quad (8)$$

Finally, the concentration of the metal is determined by the solubility product.

$$\log[M^+] = \log[K_{SO}] - \log[OH^-] - \log[HS^-] \quad (9)$$

It is possible to generate a graphical display of the solubility curves from these equations where metal concentrations are determined as a function of pH. Monhemius (1977) has published the solubility curves of four metal sulfides as a function of pH at an $H_2S$ pressure of 1 atm at 25° C. using his data and equations. Likewise, similar, but not identical figures can be generated using the data and method of Oxtoby and Nachtrieb (1990). Both methods reveal that there is a specific pH for each metal above which the metal will precipitate out of solution.

Table I gives a list of solubility products for several metal sulfides and hydroxides.

This approach is useful in calculating equilibrium values, but, unfortunately, it has two limitations. One is that it does not account for metal complexes that may form. The second is that the thermodynamic data do not include information about reaction rates. Moreover, while these tables are useful for describing the relationship for a single metal, they are not accurate for a complex ionic solution because they do not account for the "common ion" effects. Therefore, the relationships necessary for process design cannot be predicted theoretically, but rather must be determined experimentally.

TABLE 1

| | Solubility Products at 25° C. (Monhemius, 1977) Log K_{so} | | |
|---|---|---|---|
| Metal | Hydroxide (Moffliernius, 1977) | (Monhemius, 1977) | (Sulfide Oxtoby and Sulfide Nachtrieb, 1990) |
| $Al^{3+}$ | −32.0 | — | — |
| $Ca^{2+}$ | −5.3 | — | — |
| $Cd^{2+}$ | −14.3 | −28.9 | −27.2 |
| $CO^{2+}$ | −14.5 | −22.1 | — |
| $Cr^{3+}$ | −30.0 | — | — |
| $CU^{2+}$ | −19.8 | −35.9 | −36.3 |
| $Fe^{2+}$ | −16.3 | −18.8 | −18.3 |
| $Fe^{3+}$ | −38.6 | — | — |
| $Mg^{2+}$ | −11.3 | — | — |
| $Mn^{2+}$ | −12.7 | −13.3 | −13.5 |
| $Ni^{2+}$ | −15.3 | −21.0 | — |
| $Zn^{2+}$ | −16.1 | −24.5 | −24.7 |

Bhattacharyya and co-workers (1981) studied arsenic and heavy metal removal from non-ferrous smelters by controlled precipitation with sodium sulfide and lime in a single stage precipitator. They used a bench-scale process at the University of Kentucky and a full-scale treatment facility (200 m³/hr) at a Swedish copper and lead smelting plant. For the bench-scale process, they used actual scrubber wastewater from a non-ferrous smelting plant. First, the pH of the water was raised to a range of 4.0 to 5.5 using a lime slurry. Then, sodium sulfide was added, polymer was added for sedimentation, and post-filtration removed the sulfide precipitate. The results showed that they could remove 98% of the cadmium, copper, iron (total), selenium, and zinc initially present, with the optimum conditions being a pH of 8.0 and 60% of the theoretical sulfide dosage required. This was possible because some metals, such as copper, have a low solubility at a high pH. The results also indicated that arsenic removal was dependent on the ratio of ferric iron to arsenic (Fe(III)/As ratio) so that, between Fe (III)/As ratios of 0.6 to 2.0, the arsenic removal was greater than 90%. At the Swedish facility, they found that Cd, Cu, Hg and Pb were completely removed by sulfide precipitation. However, the facility was not able to adequately maintain the pH or sulfide dosage (pH values ranged from 3–5; sulfide dosages ranged from 0.8 to 3.1 times the theoretical value needed), and neither zinc nor arsenic was removed. Their research showed that arsenic sulfide precipitates better at a pH below 3, whereas zinc precipitates better at a pH above 5. Also, they found that dissolved sulfite ($SO_2^{2-}$) present in the water consumed some of the sulfide, thus reducing the amount of sulfide available for precipitation.

Previous processes, as described in many patents and publications, have attempted to remove metals from acidic waste streams to minimize the environmental impact of the wastewater release. Such processes are designed to remove all contaminants in a single stage, or as few stages as possible, with the result that the precipitated metals are co-mingled. These precipitates have little or no commercial value and are usually treated as a waste material.

SUMMARY OF THE INVENTION

It is an object of the present invention to overcome the aforesaid disadvantages of the prior art.

It is another object of the present invention to precipitate metals in the form of high quality metal sulfide and/or metal oxide/hydroxides selectively from acidic wastewater.

It is a further object of the present invention to recover individual metals from acidic wastewater.

It is another object of the present invention to recover individual metals from acidic wastewater in the form of metal sulfide and/or metal oxides or hydroxides of sufficient purity so that each metal compound obtained is of sufficient purity so that it is either marketable directly as recovered or can be further processed into a marketable product.

It is still another object of the present invention to produce a water of high quality at the discharge of the treatment process of acidic wastewater such that the treated water can be directly discharged to a nearby waterway or used for irrigation or other agricultural applications.

It is another object of the present invention to sequentially separate metals using hydroxide for pH control; hydroxide for precipitation of ferric iron and aluminum hydroxides; and sulfide for copper, zinc, ferrous iron, and manganese removal.

It is yet another object of the present invention to provide a unique SRB membrane reactor using hydrogen consuming bacteria, in which the membrane and bacteria immobilized in gel beads combine to produce significant improvements and capital cost reduction to render SRB treatment economically feasible for removal of sulfate. Bacteria immobilized in gel beads can also be used to enhance the performance of many biotreatment systems.

It is a further object of the present invention to provide a method for precipitating ferrous monosulfide from ferrous solution, particularly acid wastewater, by elevated temperature precipitation using hydrogen sulfide.

It is still another object of the present invention to provide a process for converting ferrous sulfide particles to high value products.

It is another object of the present invention to provide a membrane precipitation process using membranes to contact chemicals forming a precipitate from acidic mine waste, resulting in a desirable particle size of the precipitate.

It is yet another object of the present invention to provide a back-pulsing approach in a membrane bioreactor to prevent plugging the pores of the membranes.

According to the present invention, each metal present in acidic wastewater is selectively removed in a manner enabling the recovery of each metal individually. This can be effected simultaneously in a multi-stage process, with a removal stage for each material to be recovered. Alternatively, removal of each metal individually can be effected in a single removal stage by removal of each material to be recovered in a batch-wise manner. Accessory minerals that have no value or are present in quantities insufficient to permit economic recovery may be removed with a product material, after which the accessory mineral is recovered or removed in the processing of the product material. Materials are removed by precipitation, coagulation, settling, and filtration.

In one embodiment of the present invention, in which Berkeley Pit wastewater is treated, the pH of the wastewater is adjusted to the proper level for precipitation by sulfide formation of copper, ferrous iron, and manganese. Aluminum is removed by the addition of hydroxide. The order of precipitation is copper, ferric iron, zinc, aluminum, ferrous iron, and manganese. The ferric iron may be precipitated with the copper if it is not to be recovered separately.

In order to achieve highly pure product, and to clean the wastewater to a purity suitable for discharge, it is important to:
1. maintain the proper range of pH, pS and Eh while adding the precipitating agent;
2. add the required amount of precipitating reagent without exceeding that amount required; and
3. maintain adequate settling time for the precipitate to form and settle out of solution.

Appropriate conditions are required to quantitatively remove the desired material for recovery and reuse in the appropriate stage, and to remove accessory metals (arsenic, cadmium, cobalt, and nickel as well as ferric iron, in applications where it is not a principal product) in a stage that results in a product in which the presence of these accessory metals is not objectionable.

Copper is removed as cupric sulfide, a material that is suitable for copper recovery using existing copper smelting technology within the existing industrial infrastructure. Because iron and accessory trace metals such as arsenic, cobalt, chromium, and nickel are impurities in existing copper ore feed stocks, these accessory metals are acceptable in small amounts.

As one example of a useful metal ion recovered from acidic wastewater, ferrous iron is key in producing certain high value iron pigments, particularly goethite, hematite, and magnetite. These pigments are used as colorants in materials such as bricks, concretes, paints, and very high value uses such as cosmetics. Manganese, an important alloy material in steel making, can be recovered as manganese sulfide and processed into the steel alloy material.

The precipitation scheme of the present invention offsets the investment and operating cost of the precipitation process by yielding metal sulfides and hydroxides, as products of suitable purity that can be sold as raw materials to be converted by others to high value products, such as pigments, catalysts, and other useful metal compounds.

The present invention produces not only high quality process water but also high purity metal compound precipitates which can be sold to reduce the cost of the treatment process. Table 2 shows the percentage of product recovered by weight, and the purity of the recovered product.

TABLE 2

| Product Recoveries and Purities - averages | | | | | |
|---|---|---|---|---|---|
| % by wt. | CuS | Fe(OH)$_3$ | ZnS | Al(OH)$_3$ | FeS | MnS |
| Recovered | 99.8 | 99+ | 99.5–100 | 99.8 | 99+ | 87.4 |
| Purity | 92.4 | 81.5 | 97.8 | 95.6 | 92.1 | 75.0 |

The precipitation process of the present invention is superior over currently known wastewater treatment processes for the following reasons:

It provides a process producing high purity precipitates with high recovery. It separates the metal sulfides as high purity precipitates: copper, zinc, ferric iron, ferrous iron and manganese are separated as sulfides at high purity and high recovery, while aluminum is separated as aluminum hydroxide, also at high purity and high recovery, in commercially useful amounts. The process is a selective, sequential process using hydroxide to manage pH for the precipitation of the heavy metals with sulfide (copper, zinc, ferric and ferrous iron, and manganese) and hydroxide precipitation for the removal of the light metal (aluminum) and/or ferric iron.

The toxic metals present in the AMD (acid mine drainage) are precipitated with the copper and zinc fractions. These products are suitable for feed to primary smelters without further processing. In these processes, they are captured in the smelter residue without adding any appreciable waste content, as they are commonly associated with the materials fed to these smelters.

The water produced by the process is relatively pure and is suitable for agricultural irrigation. With polishing, it would be suitable for stream discharge at EPA's Gold Book Standards.

The process may be designed to operate in either a multi-stage continuous or batch type arrangement.

The batch process is also capable of forming high purity metal precipitates as either sulfides or hydroxides with high yield. All previous publications have presented only a brief outline of a continuous precipitation process; no mention has been made of the use of, or the performance of, a batch process.

Further, in both the continuous and batch processes as described herein, the hydrogen sulfide may be produced biogenically in a novel bioreactor, which reduces sulfate concentration of the wastewater to a level suitable for discharge.

Other processes described in the literature describe the bulk removal of all metals in a single or double stage lime precipitation or with sulfide alone. A few describe recovery of copper and/or zinc. The Rowley patent (U.S. Pat. No. 5,587,079) describes the recovery of copper and zinc as sulfide using biogenic sulfide, but their reactor design is inferior to the present design. Also the Rowley patent describes a three stage process in which copper is recovered in the first stage, zinc in the second stage, and the remaining metals are precipitated together in the third stage as a waste material. Further, their metal removal and product purities are significantly less than those achieved in the present invention. No mention is made of the purity of the water produced by the process.

DETAILED DESCRIPTION OF THE INVENTION

The following experimental studies illustrate the present invention, but are not intended to be limiting of the scope of the invention. All of the experimental studies were conducted with acid mine drainage from the Berkeley Pit, located in Butte, Mont., unless otherwise noted. The Berkeley Pit contains over 30 billion gallons of acid mine water with some 3 to 5 million gallons being added each day, depending upon operating conditions. This water contains relatively dilute levels of heavy metals. The pH ranges from 2.2 to 2.7.

Table 3 gives the concentrations of the dissolved metals present in the Berkeley Pit water. This source was chosen because it represents the largest single source of acid mine drainage in the U.S., and has been classified as the largest Superfund site in the nation. However, the experimental findings in the present application can be used to recover metals from any metal-bearing waste stream and/or acid mine drainage from sources other than the Berkeley Pit.

TABLE 3

Average Dissolved Metal Concentrations in Berkeley Pit Mine Water.

| (a) Constituent | [0055] Average Concentration (mg/L or ppm) |
| --- | --- |
| Al | 293 |
| Cu | 223 |
| Mn | 223 |
| $Fe^{+++}$ | 150 |
| $Fe^{++}$ | 514 |
| Zn | 630 |
| Cd | 1.38 |
| Ni | 2.14 |
| As | 0.512 |
| Co | 1.23 |
| $SO_4^{2-}$ | 2,400 |
| $Cl^-$ | 16 |
| Na | 213 |

The experimental section of this patent application is divided into the following four parts:

I. Metal precipitation Studies

II. Application of Membranes for Biological Sulfate Reduction; the hydrogen sulfide produced by sulfate reduction can be used for metal precipitation III. Precipitate Settling Studies IV. Conversion of Iron Sulfide to other Products I. Metal Precipitation Studies

EXPERIMENT 1

Batch Precipitation Process

Figure 1:
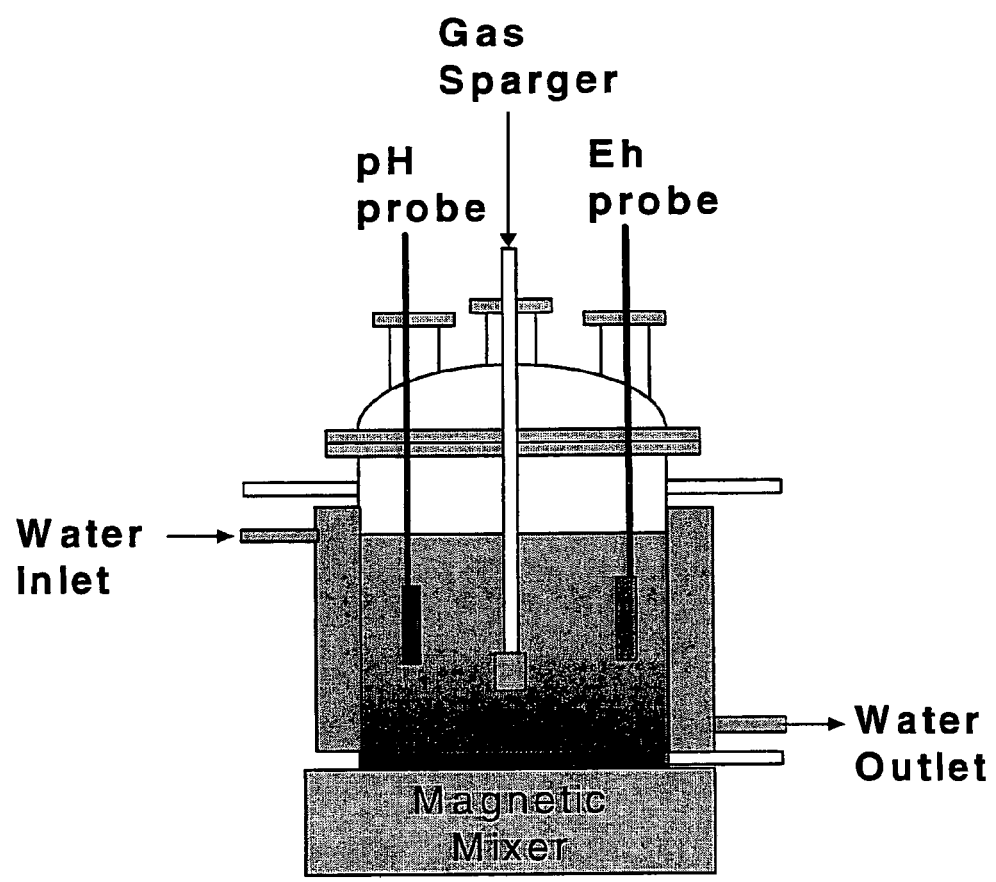
FIG. 1 shows a schematic of the batch precipitation process.

This process and subsequent experimental study was conducted to establish the precipitation conditions required to obtain high purity precipitates from acid mine drainage. FIG. 1 shows a schematic of the batch precipitation process.

Feed water is pumped into a reservoir, then pumped to a reactor 10. The left-hand side of the reactor is where the primary reaction takes place. Upon addition of hydrogen sulfide to Berkeley Pit water at the proper conditions, metal sulfides were precipitated from the water. A mixture of hydrogen sulfide and carbon dioxide gas (to simulate the product of SRBs) was bubbled into the solution through a gas sparger 12 (which simultaneously provides mixing for the reaction). The Eh probe 14 and pH probe 15 are used to control the Eh and pH of the solution during the reaction. A pH controller and pump maintain the solution at the desired pH for precipitation by addition of sulfuric acid (3.70 M). The right-hand side of the reactor is designed to allow settling time to minimize carry-over of solids from one reactor to another. The sulfide concentration was maintained by controlling the gas flowrate bubbling through the reactor liquid.

The batch process was operated sequentially to obtain the various metal sulfide/hydroxide precipitates and the water was analyzed to assure mass balance. Table 4 summarizes the operating conditions of the various stages, operated sequentially using the same reactor apparatus.

Samples were analyzed for thirteen metals using ICP (method SW-846-6010B). Sulfate ion was measured using method SW-846-903B. Chloride ion was measured using EPA method 325.3, and the pH was measured by EPA method 150.1.

TABLE 4

Summary of the operating conditions for the batch reactor system.

| Sequential stage Number | Operating Conditions |
|---|---|
| Stage 1 (Copper Sulfide) | Temperature = 10° C.<br>pH = influent pH of AMD<br>pS = 10–15<br>Eh = –100 to –120 mV |
| Stage 2 (Ferric Hydroxide) | Temperature = 25° C.<br>pH = 4.5<br>pS < 2<br>Nitrogen gas sparged |
| Stage 3 (Zinc Sulfide) | Temperature = 25° C.<br>pH = 4.5<br>pS = 10–15<br>Eh = –100 to –120 mV |
| Stage 4 (Aluminum Hydroxide) | Temperature = 25° C.<br>pH = 6.0<br>Nitrogen gas sparged |
| Stage 5 (Ferrous Sulfide) | Temperature = 25° C.<br>pH = 6.0<br>pS = 5–8<br>Eh = –180 to –200 mV |
| Stage 6 (Manganese Sulfide) | Temperature = 25° C.<br>pH = 8.0<br>pS = 10–15<br>Eh = –100 to –120 mV |

Liquid samples were taken initially and after each precipitation was completed. Precipitate samples were collected after each precipitate step was completed.

Table 5 shows the metal recoveries obtained at the end of each stage (step). It can be seen that as long as the proper operating conditions were maintained in the batch reactor, almost complete precipitation of each metal was obtained. Further, precipitate analysis showed that the metal precipitates were very pure.

Special conditions were obtained in the case of ferric and ferrous sulfide precipitation.

TABLE 5

Metal Recoveries and purities from the batch precipitation study.

| Metal | Al | Cd | Co | Cu | Fe (II) | Fe (III) | Mn | Ni | Zn |
|---|---|---|---|---|---|---|---|---|---|
| % Recovery | 99.3 | 98.6 | –2.5 | 99.7 | 98.6 | 96.4 | 99.1 | 89.3 | 98.1 |
| % Purity | 90.2 | — | — | 98.4 | 99.1 | 90.6 | 99.3 | — | 97.4 |

Figure 2:
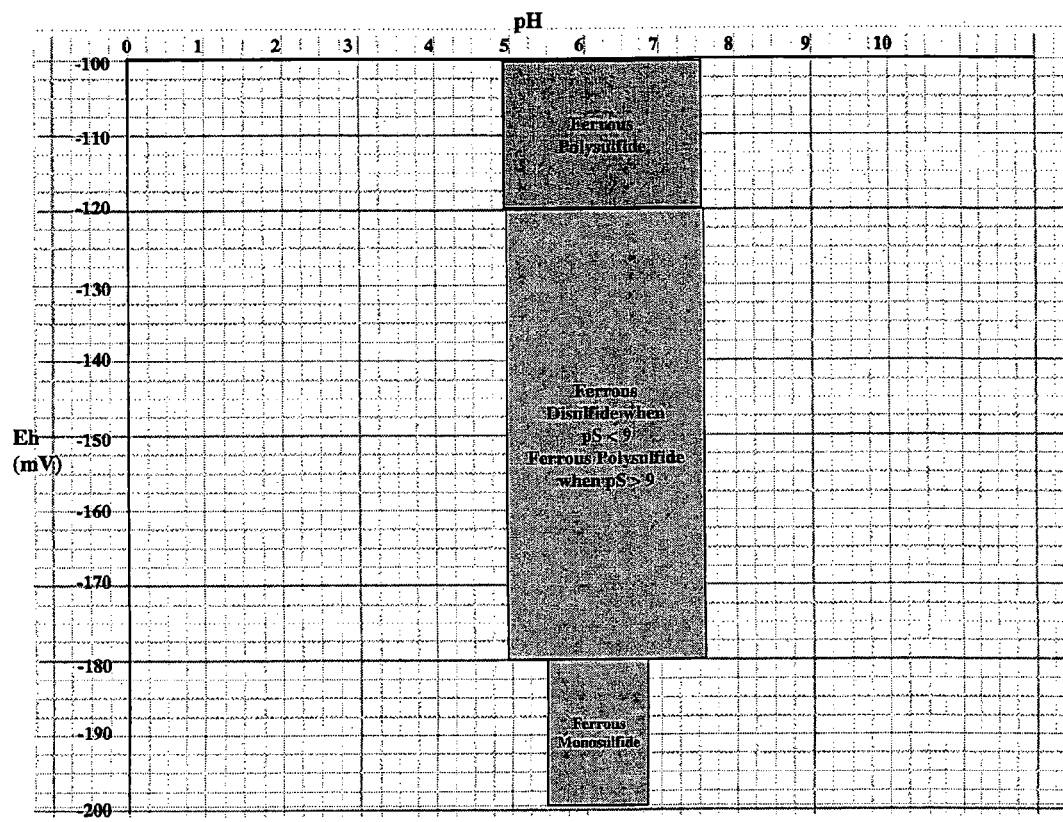
FIG. 2 shows the Eh-pH diagram for ferrous sulfide precipitation. The shaded region shows the Eh, pH and pS conditions needed to control the chemical composition of the iron product formed by precipitation of iron sulfide.

Further, FIG. 2 shows a Eh-pH diagram to illustrate the very low oxidation state required for the stability of iron monosulfide, FeS, and the general redox dependence of FeS and pyrite, FeS2. This is a simulated result obtained using the experimental data obtained from the batch reactor system as input to the Geochemist's Workbench (Bethke 1992a, b; 1996).

EXPERIMENT 2

Batch-Wise Selective Precipitation Experiment Using Hydrogen Sulfide

In this experiment, the tests were conducted batch-wise sequentially rather than simultaneously. The AMD was blanketed under argon gas and stirred continuously. The precipitation was conducted in batch-wise stages, using the filtrate liquid from the previous stage.

The pH at each stage was adjusted before precipitation using a caustic solution, either sodium or potassium hydroxide. The pH values selected for each batch stage are given in Table 6. Once the correct pH value had been obtained, the AMD solution was introduced into a hermetically sealed apparatus that provided capabilities for measuring the pressure of the head space, the removal of gas from the head space, and the introduction of hydrogen sulfide gas from an external source. Caustic was used as the precipitating agent in the aluminum removal stage.

The head space within the reactor was then evacuated by the vacuum pump. Once evacuated, the flow of hydrogen sulfide/carbon dioxide was started. This flow continued until a predetermined head space pressure was obtained. The hydrogen sulfide gas was introduced at 110% of the stoichiometric amount needed for the target metal was used. The effluent solution was filtered through 0.2 micron filter paper. The precipitate and filtrate samples were analyzed for the metals present by ICAP (inductively coupled argon plasma) spectrometer.

The gas used to precipitate the other metals in the preliminary experiment was a 50/50 percent mixture of carbon dioxide and hydrogen sulfide, a composition comparable to that produced biologically by sulfate reducing bacteria using an organic compound as a feedstock. It was found that the carbon dioxide in the gas used for this experiment formed carbonates in the presence of ferric ions and interfered with effective metal precipitation. Further experimentation of metal precipitation in the presence of ferric ion was performed using 100% pure hydrogen sulfide gas as the precipitating agent was conducted to circumvent this interference. This approach corresponds with the composition of the product gas from an SRB reactor utilizing hydrogen consuming bacteria fed with hydrogen and carbon dioxide as feedstock.

Each precipitation was conducted step-wise in a single vessel, using the filtrate liquid from the previous step. The pH at each step was adjusted before the precipitation, using hydroxide. The precipitation was achieved using either sodium hydroxide or hydrogen sulfide, as appropriate. The optimal pH values selected for each batch stage are given in Table 6.

TABLE 6

Optimal pH Selected for Each Batch Stage.

| Batch Stage | pH Selected | Chemical Used for Precipitation |
|---|---|---|
| 1 | 2.6 | Hydrogen Sulfide gas |
| 2 | 4.5 | Sodium Hydroxide solution |
| 3 | 4.5 | Hydrogen Sulfide gas |
| 4 | 6.0 | Sodium Hydroxide solution |
| 5 | 6.5 | Hydrogen Sulfide gas |
| 6 | 9.2 | Hydrogen Sulfide gas |

TABLE 7

Initial and Final concentrations of metals using 110% of stoichiometric pure hydrogen sulfide gas and mass balance calculations.

STAGE #1

Conditions: pH 2.6
Temp. 25 C.
Feed amount (L) = 1000

| Element | Na | Al | Zn | Cu | Ni | Co | Fe | Mn | As |
|---|---|---|---|---|---|---|---|---|---|
| Initial Concentration (mg/L) | 117.900 | 241.920 | 265.700 | 173.410 | 1.231 | 1.930 | 237.800 | 85.800 | 0.007 |
| Final Concentration (mg/L) | 117.900 | 239.710 | 264.900 | 5.590 | 1.231 | 1.900 | 237.200 | 85.800 | 0.007 |
| Initial Amount (g) | 117.900 | 241.920 | 265.700 | 173.410 | 1.231 | 1.930 | 237.800 | 85.800 | 0.007 |
| Final Amount (g) | 117.900 | 239.710 | 264.900 | 5.590 | 1.231 | 1.900 | 237.200 | 85.800 | 0.007 |
| Volume of H2S gas (STP) (L) | 68.683 | | | | | | | | |
| Mass of Sulfur precipitated (g) | 89.199 | | | | | | | | |
| Precipitate (g) (elemental) | | 2.210 | 0.800 | 167.820 | 0.000 | 0.030 | 0.600 | 0.000 | 0.000 |
| Precipitate (g) (sulfides) | | 6.14 | 1.19 | 252.32 | 0.00 | 0.05 | 0.94 | 0.00 | 0.00 |
| Total Mass of Precipitate (g) | | 260.71 | | | | | | | |
| Precipitate Composition (%) | | 0.85 | 0.31 | 64.37 | 0.00 | 0.01 | 0.23 | 0.00 | 0.00 |

STAGE #2
Sodium Hydroxide addition

Conditions: pH 4.5
Temp. 25 C.
Feed amount (L) = 1000

| Element | Na | Al | Zn | Cu | Ni | Co | Fe | Mn | As |
|---|---|---|---|---|---|---|---|---|---|
| Initial Concentration (mg/L) | 117.900 | 239.710 | 264.900 | 5.590 | 1.231 | 1.900 | 237.200 | 85.800 | 0.007 |
| Final Concentration (mg/L) | 137.800 | 235.600 | 232.900 | 1.200 | 1.231 | 1.900 | 115.200 | 85.800 | 0.000 |
| Initial Amount (g) | 117.900 | 239.710 | 264.900 | 5.590 | 1.231 | 1.900 | 237.200 | 85.800 | 0.007 |
| Final Amount (g) | 137.800 | 235.600 | 232.900 | 1.200 | 1.231 | 1.900 | 115.200 | 85.800 | 0.000 |
| Volume of H2S gas (STP) (L) | 0.000 | | | | | | | | |
| Mass of Sulfur added (g) | 0.000 | | | | | | | | |
| Mass of pure NaOH added (g) | 34.61 | | | | | | | | |
| Precipitate (g) (elemental) | | 4.110 | 32.000 | 4.390 | 0.000 | 0.000 | 122.000 | 0.000 | 0.007 |
| Precipitate (g) (hydroxide) | | 11.87 | 48.64 | 6.74 | 0.00 | 0.00 | 196.27 | 0.00 | 0.01 |
| Total Mass of Precipitate (g) | | 263.53 | | | | | | | |
| Precipitate Composition (%) | | 1.56 | 12.14 | 1.67 | 0.00 | 0.00 | 46.29 | 0.00 | 0.00 |

STAGE #3

Conditions: pH 4.5
Temp. 25 C.
Feed amount (L) = 1000

| Element | Na | Al | Zn | Cu | Ni | Co | Fe | Mn | As |
|---|---|---|---|---|---|---|---|---|---|
| Initial Concentration (mg/L) | 137.800 | 235.600 | 232.900 | 1.200 | 1.231 | 1.900 | 115.200 | 85.800 | 0.000 |
| Final Concentration (mg/L) | 137.800 | 235.600 | 1.470 | 0.000 | 1.231 | 1.900 | 62.570 | 85.800 | 0.000 |
| Initial Amount (g) | 137.800 | 235.600 | 232.900 | 1.200 | 1.231 | 1.900 | 115.200 | 85.800 | 0.000 |
| Final Amount (g) | 137.800 | 235.600 | 1.470 | 0.000 | 1.231 | 1.900 | 62.570 | 85.800 | 0.000 |
| Volume of H2S gas (STP) (L) | 111.086 | | | | | | | | |
| Mass of Sulfur precipitated (g) | 144.268 | | | | | | | | |
| Precipitate (g) (elemental) | | 0.000 | 231.430 | 1.200 | 0.000 | 0.000 | 52.630 | 0.000 | 0.000 |
| Precipitate (g) (sulfides) | | 0.00 | 344.67 | 1.80 | 0.00 | 0.00 | 82.79 | 0.00 | 0.00 |
| Total Mass of Precipitate (g) | | 430.48 | | | | | | | |
| Precipitate Composition (%) | | 0.00 | 88.77 | 0.46 | 0.00 | 0.00 | 20.19 | 0.00 | 0.00 |

STAGE #4
Sodium Hydroxide addition

Conditions: pH 6
Temp. 25 C.
Feed amount (L) = 1000

| Element | Na | Al | Zn | Cu | Ni | Co | Fe | Mn | As |
|---|---|---|---|---|---|---|---|---|---|
| Initial Concentration (mg/L) | 137.800 | 235.600 | 1.470 | 0.000 | 1.231 | 1.900 | 62.570 | 85.800 | 0.000 |
| Final Concentration (mg/L) | 162.900 | 22.790 | 0.760 | 0.000 | 1.231 | 1.900 | 62.570 | 85.000 | 0.000 |
| Initial Amount (g) | 137.800 | 235.600 | 1.470 | 0.000 | 1.231 | 1.900 | 62.570 | 85.800 | 0.000 |
| Final Amount (g) | 162.900 | 22.790 | 0.760 | 0.000 | 1.231 | 1.900 | 62.570 | 85.000 | 0.000 |
| Volume of H2S gas (STP) (L) | 0.000 | | | | | | | | |
| Mass of Sulfur added (g) | 0.000 | | | | | | | | |
| Mass of pure NaOH added (g) | 43.65 | | | | | | | | |

TABLE 7-continued

Initial and Final concentrations of metals using 110% of stoichiometric pure hydrogen sulfide gas and mass balance calculations.

| | | | | | | | | |
|---|---|---|---|---|---|---|---|---|
| Precipitate (g) (elemental) | | 212.810 | 0.710 | 0.000 | 0.000 | 0.000 | 0.000 | 0.800 0.000 |
| Precipitate (g) (hydroxide) | | 614.78 | 1.08 | 0.00 | 0.00 | 0.00 | 0.00 | 1.30 0.00 |
| Total Mass of Precipitate (g) | | 617.84 | | | | | | |
| Precipitate Composition (%) | | 81.63 | 0.27 | 0.00 | 0.00 | 0.00 | 0.00 | 0.31 0.00 |

STAGE #5

Conditions: pH 6.5
Temp. 25 C.
Feed amount (L) = 1000

| Element | Na | Al | Zn | Cu | Ni | Co | Fe | Mn | As |
|---|---|---|---|---|---|---|---|---|---|
| Initial Concentration (mg/L) | 162.900 | 22.790 | 0.760 | 0.000 | 1.231 | 1.900 | 62.570 | 85.000 | 0.000 |
| Final Concentration (mg/L) | 162.900 | 22.790 | 0.760 | 0.000 | 1.100 | 0.890 | 2.700 | 85.000 | 0.000 |
| Initial Amount (g) | 162.900 | 22.790 | 0.760 | 0.000 | 1.231 | 1.900 | 62.570 | 85.000 | 0.000 |
| Final Amount (g) | 162.900 | 22.790 | 0.760 | 0.000 | 1.100 | 0.890 | 2.700 | 85.000 | 0.000 |
| Volume of H2S gas (STP) (L) | 26.890 | | | | | | | | |
| Mass of Sulfur precipitated (g) | 34.923 | | | | | | | | |
| Precipitate (g) (elemental) | | 0.000 | 0.000 | 0.000 | 0.131 | 1.010 | 59.870 | 0.000 | 0.000 |
| Precipitate (g) (sulfides) | | 0.00 | 0.00 | 0.00 | 0.20 | 1.56 | 94.17 | 0.00 | 0.00 |
| Total Mass of Precipitate (g) | | 95.93 | | | | | | | |
| Precipitate Composition (%) | | 0.00 | 0.00 | 0.00 | 0.05 | 0.39 | 22.96 | 0.00 | 0.00 |

STAGE #6

Conditions: pH 9.2
Temp. 25 C.
Feed amount (L) = 1000

| Element | Na | Al | Zn | Cu | Ni | Co | Fe | Mn | As |
|---|---|---|---|---|---|---|---|---|---|
| Initial Concentration (mg/L) | 162.900 | 22.790 | 0.760 | 0.000 | 1.100 | 0.890 | 2.700 | 85.000 | 0.000 |
| Final Concentration (mg/L) | 162.900 | 2.300 | 0.000 | 0.000 | 0.100 | 0.320 | 1.100 | 3.600 | 0.000 |
| Initial Amount (g) | 162.900 | 22.790 | 0.760 | 0.000 | 1.100 | 0.890 | 2.700 | 85.000 | 0.000 |
| Final Amount (g) | 162.900 | 2.300 | 0.000 | 0.000 | 0.100 | 0.320 | 1.100 | 3.600 | 0.000 |
| Volume of H2S gas (STP) (L) | 66.210 | | | | | | | | |
| Mass of Sulfur precipitated (g) | 85.987 | | | | | | | | |
| Precipitate (g) (elemental) | | 20.490 | 0.760 | 0.000 | 1.000 | 0.570 | 1.600 | 81.400 | 0.000 |
| Precipitate (g) (sulfides) | | 56.92 | 1.13 | 0.00 | 1.55 | 0.88 | 2.52 | 128.81 | 0.00 |
| Total Mass of Precipitate (g) | | 191.83 | | | | | | | |
| Precipitate Composition (%) | | 7.86 | 0.29 | 0.00 | 0.38 | 0.22 | 0.61 | 31.22 | 0.00 |

Table 7 gives the results of the initial and final concentrations of each metal, and the results of mass balance calculations, using 1000 liters of AMD as the basis. Fairly pure precipitates are obtained, as indicated by the summary shown in Table 7.

TABLE 7B

Summary of the amounts of each metal precipitated or removed in each stage and the corresponding percentage removals.

| Metal Components | Al | Zn | Cu | Ni | Co | Fe | Mn | As | Cd |
|---|---|---|---|---|---|---|---|---|---|
| Inlet Amount (g) | 241.920 | 265.700 | 173.410 | 1.231 | 1.930 | 237.800 | 85.800 | 0.007 | 1.543 |
| Stage 1 | 2.210 | 0.800 | 167.820 | 0.000 | 0.030 | 0.600 | 0.000 | 0.000 | 0.051 |
| Stage 2 | 4.11 | 32 | 4.39 | 0 | 0 | 122 | 0 | 0.007 | 0.002 |
| Stage 3 | 0.000 | 231.430 | 1.200 | 0.000 | 0.00 | 52.630 | 0.000 | 0.000 | 0.950 |
| Stage 4 | 212.810 | 0.710 | 0.000 | 0.000 | 0.000 | 0.000 | 0.800 | 0.000 | 0.520 |
| Stage 5 | 0 | 0 | 0 | 0.131 | 1.01 | 59.87 | 0 | 0 | 0 |
| Stage 6 | 20.490 | 0.760 | 0.000 | 1.000 | 0.570 | 1.600 | 81.400 | 0.000 | 0.020 |
| Total Removed (g) | 239.620 | 265.700 | 173.00 | 1.131 | 1.610 | 236.700 | 82.200 | 0.007 | 1.543 |
| Amt. In Effluent | 2.3 | 0 | 0 | 0.1 | 0.32 | 1.1 | 3.6 | 0 | 0 |

| % Removal | Al | Zn | Cu | Ni | Co | Fe | Mn | As | Cd |
|---|---|---|---|---|---|---|---|---|---|
| Stage #1 | 0.9 | 0.3 | 96.8 | 0.0 | 1.6 | 0.3 | 0.0 | 0.0 | 3.3 |
| Stage #2 | 1.7 | 12.0 | 2.5 | 0.0 | 0.0 | 51.3 | 0.0 | 100.0 | 0.1 |
| Stage #3 | 0.0 | 87.1 | 0.7 | 0.0 | 0.0 | 22.1 | 0.0 | 0.0 | 61.6 |

TABLE 7B-continued

Summary of the amounts of each metal precipitated or removed in each stage and the corresponding percentage removals.

| Stage #4 | 88.0 | 0.3 | 0.0 | 0.0 | 0.0 | 0.0 | 0.9 | 0.0 | 33.7 |
|---|---|---|---|---|---|---|---|---|---|
| Stage #5 | 0.0 | 0.0 | 0.0 | 10.6 | 52.3 | 25.2 | 0.0 | 0.0 | 0.0 |
| Stage #6 | 8.5 | 0.3 | 0.0 | 81.2 | 29.5 | 0.0 | 0.0 | 0.0 | 0.0 |
| Total | 99.0 | 100.0 | 100.0 | 91.9 | 83.4 | 99.5 | 95.8 | 100.0 | 100.0 |

This experiment demonstrates that a batch process is able to produce fairly high purity precipitates, and the final effluent meets EPA's Gold Book Standard. It should be noted that the above numbers are based on mass balance calculations, especially for the intermediate and final effluents. Actual experimental analysis of the final effluent water is shown in Table 8.

EXPERIMENT 3

Studies on Membrane Precipitation

Although metals can be precipitated as sulfides using hydrogen sulfide gas, either alone or in a mixture, there are several problems associated with using sparged gas. These problems include the following issues.

1. The unused hydrogen sulfide gas must be recycled into the precipitator, which requires a recycle compressor.
2. The use of a recycle compressor introduces high investment and operating costs for the mechanical equipment because hydrogen sulfide is a corrosive gas.
3. It is critical to control the rate of hydrogen sulfide gas dissolution in water and subsequent reaction with the metal sulfates to form insoluble sulfides that are of sufficient size to settle rapidly. In a sparged system, it is difficult to control the addition of hydrogen sulfide gas in stoichiometric or controlled amounts to the acid mine drainage liquid, since the usual method is simply to bubble the gas through the liquid.
4. The formation of colloidal metal sulfide particles, which are difficult to settle and which require special additives to agglomerate, is common in sparging and results in both increased capital and operating costs.

Figure 3:
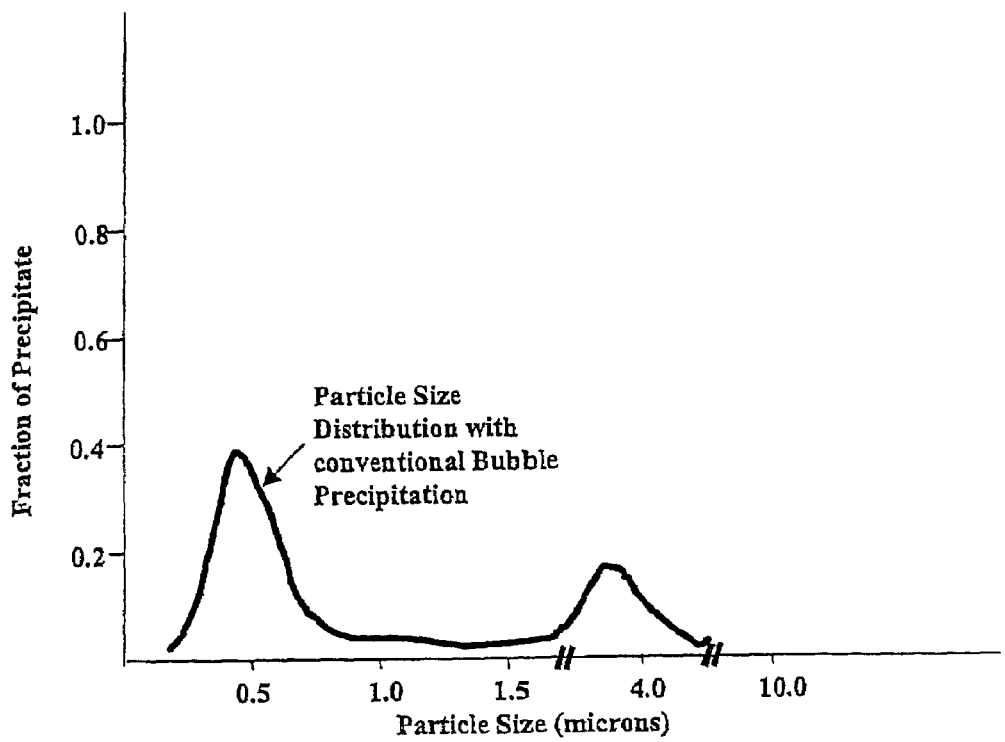
FIG. 3 shows the particle size distribution obtained from a conventional bubble precipitator.

FIG. 3 shows the distribution of particle sizes that was obtained in a previous study (Govind, et al. 1999) using a 50-50 mixture of hydrogen sulfide and carbon dioxide gases which was bubbled through acid mine drainage.

As can be seen from FIG. 3, the particle size distribution (weight fraction) obtained by bubbling a 50-50 mixture of hydrogen sulfide and carbon dioxide gas mixture through acid mine drainage is bimodal, with the bulk of the precipitate shifted into the sub-micron range. It can be seen that colloidal metal sulfide particles are produced, which are difficult to settle without the use of additives.

Figure 4:
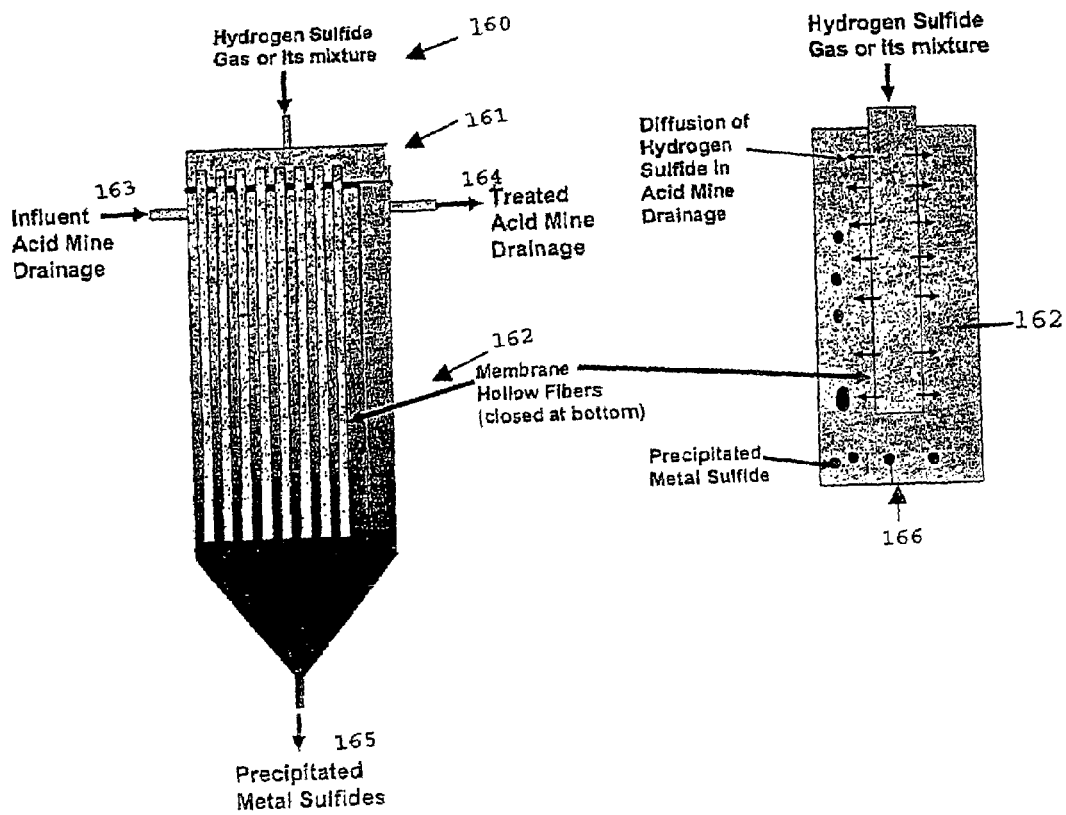
FIG. 4 shows a schematic of the Membrane Precipitator apparatus for treating acidic metal-bearing wastewaters.

FIG. 4 shows a membrane system used to precipitate metal sulfides using hydrogen sulfide gas, either alone or in mixtures of gases. The system (160) comprises a vessel (161) for retaining the membranes (162) with an inlet (163) for acid mine drainage and an outlet (162) for treated acid mine drainage. Precipitated metal sulfides (166) exit the vessel at the bottom thereof, (165).

The major advantages of the membrane precipitator include:

1. Because it eliminates bubble formation, no hydrogen sulfide recycle is required, since there is no gas bubbling through the acid mine drainage.
2. Only a low gas pressure is needed to introduce the hydrogen sulfide gas into the acid mine drainage with dissolution at the membrane interface and subsequent reaction.
3. It provides a very high contact surface area between the gas and the liquid because of the small pore sizes in the membrane hollow fiber.
4. It results in the formation of particles from the metal sulfide precipitation having desirable settling characteristics.

Figure 5:
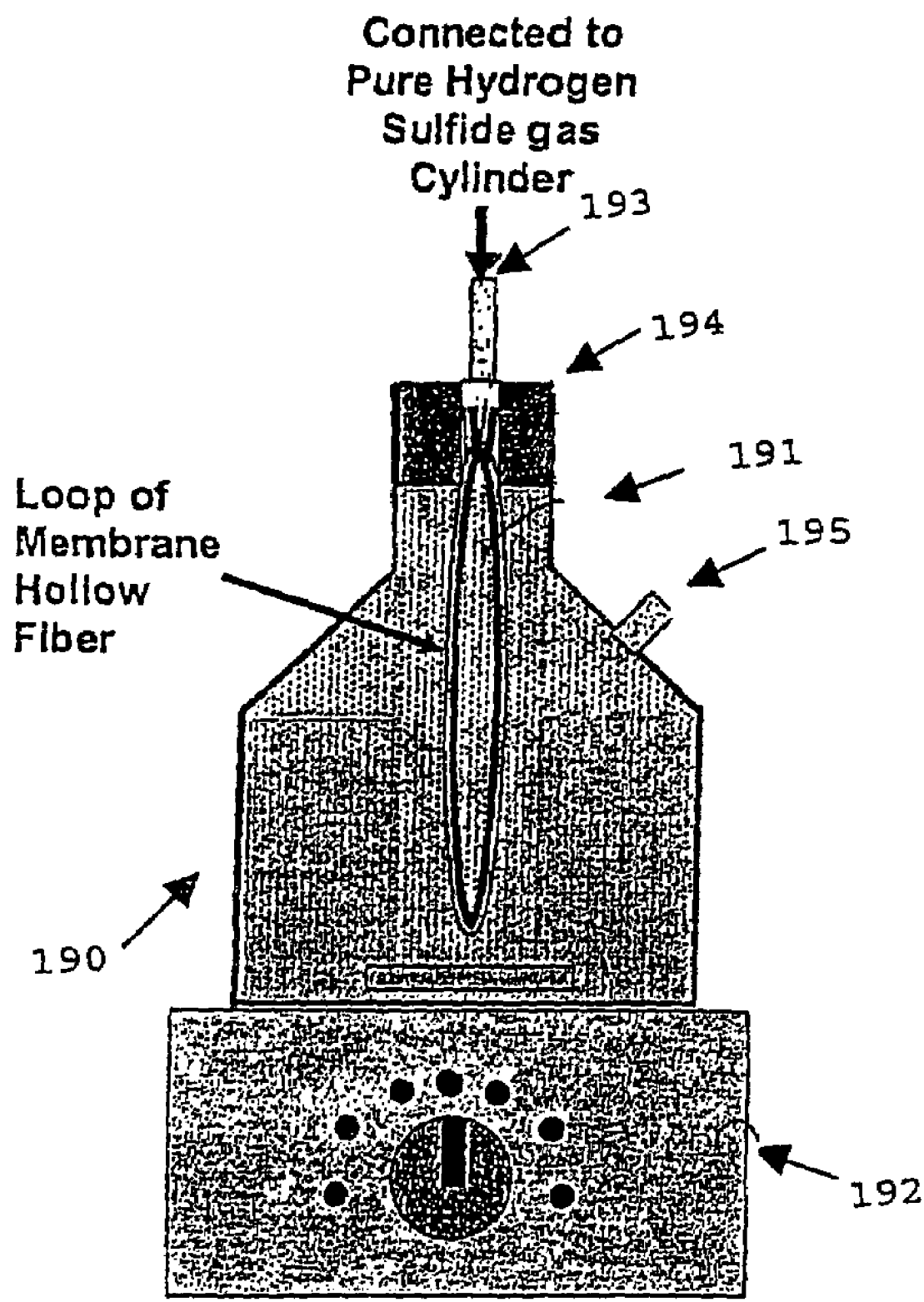
FIG. 5 shows a laboratory membrane precipitator system.

Preliminary experimental studies were conducted using an apparatus as detected in FIG. 5. The apparatus includes a single hollow fiber (2 mm internal diameter, 0.2 microns average pore size, polypropylene material) which was 22.4 cm long inserted in a flask (190). The hollow fiber was affixed to a header (194). A cylinder containing pure hydrogen sulfide gas was connected to the hollow fiber (193), which allowed the hydrogen sulfide gas to flow through the fiber and diffuse through the micro-pores along the length of the fiber. This system was placed onto a magnetic mixer (192) for stirring the reaction mixture.

Liquid samples were periodically withdrawn from the side port of the flask, filtered and analyzed for metal concentration using ICP analysis. Samples were withdrawn at different time intervals, while hydrogen sulfide gas was allowed to diffuse and react with the metal sulfate in acid mine water.

Figure 6:
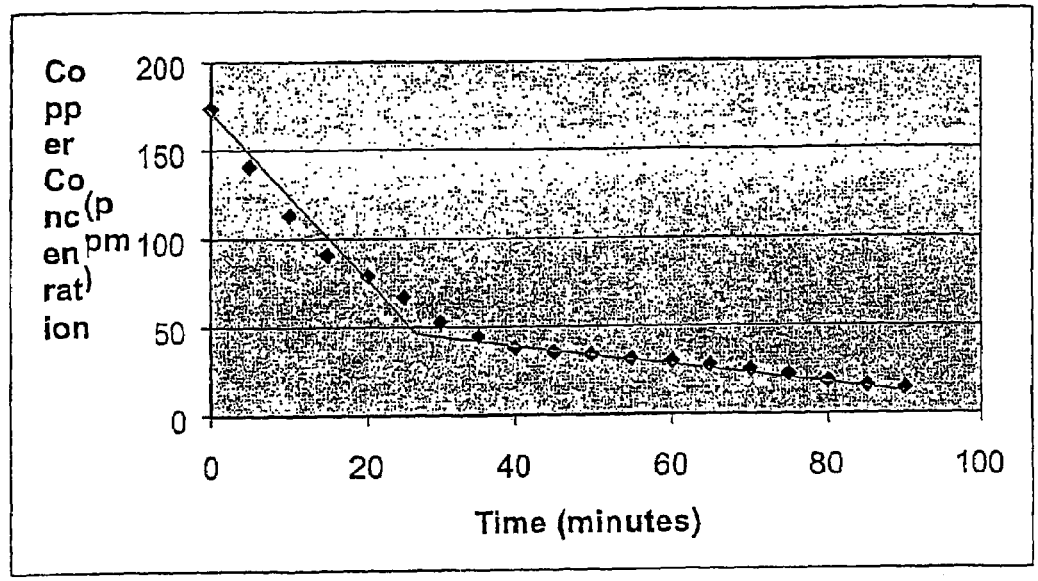
FIG. 6 shows the copper concentration in acid mine water during treatment in the batch laboratory membrane precipitator.

Experimental measurements of copper concentrations in acid mine drainage as a function of time were made using the above-described apparatus. The experimental conditions were pH=2.4, temperature 25° C. FIG. 6 shows the experimental data as a function of time. It can be seen from FIG. 6 that the initial rate of precipitation, fitted by a straight line, is much higher than the rate achieved after 25 minutes, as shown by the second line. This decrease in rate of precipitation, which results in decreasing copper concentration in the liquid phase, is caused mainly by pore plugging of the membrane pores by the deposited copper sulfide particles. As the membrane pores become plugged, the contact surface area between the hydrogen sulfide gas and the acid mine drainage decreases, thereby causing the rate of precipitation to decline. Furthermore, since the rate of precipitation is constant with time, the precipitation process is mass transfer controlled, and the reaction kinetics forming copper sulfide from copper sulfate is much faster than the rate of mass transfer.

After the experiment, when the membrane fiber was withdrawn from the liquid, it was discolored by a black copper sulfide precipitate, again indicating that surface and pore precipitation of copper sulfide had occurred in the membrane fiber.

Figure 7:
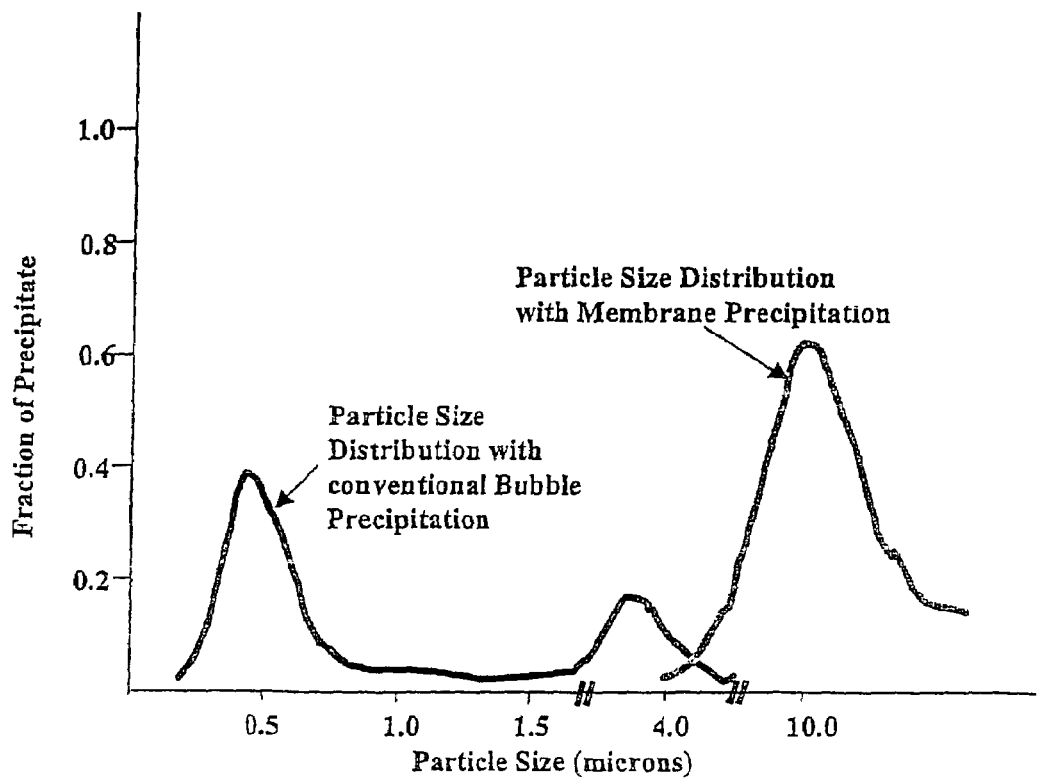
FIG. 7 compares particle size distribution between conventional bubble precipitation and membrane precipitation.

The particle size distribution of the metal sulfide precipitate was determined and is shown in FIG. 7. The particle size distribution obtained with bubbling of hydrogen sulfide gas is also shown on the same plot for comparison. It can be seen that the particle size obtained using a membrane precipitator is much larger than the size obtained by bubbling hydrogen sulfide gas. This larger size of this precipitate facilitates its settling and removal from the precipitation system.

EXPERIMENT 4

Experiments with Membrane Precipitator and Encapsulated SRB Bacteria

Experiments were also conducted with membrane precipitator and encapsulated SRB bacteria in gel beads. Active sulfate reducing bacteria (SRBs) were encapsulated in two kinds of gels: (1) silica gel; and (2) polyvinyl alcohol gel. Silica gel beads were made as follows:

3% alginate solution and distilled water were added into the colloidal silica solution so that the final concentration of alginate, biomass and colloidal silica would become 1.5%, 5% and 5–20%, respectively. The pH of the colloidal silica solution was maintained between about 6–7. The solution thus prepared was dropped into a 5% $CaCl_2$ solution to form beads of about 0.4 cm in diameter. Then the beads were cured for 5 hours in the solution containing equal concentration of biomass in gel in order to prevent bacteria from diffusing out into the liquid solution.

Polyvinyl alcohol beads cross-linked with sodium nitrate were synthesized as follows:

Polyvinyl alcohol (PVA), 80 g, with 99–100% saponification and about 1,500–2,500 degree of polymerization was mixed with 6 g of sodium alginate and diluted with deionized water to 500 mL. The mixture was heated until all the material dissolved to form a homogeneous mixture. The solution was then cooled down and mixed with 500 mL of SRB biomass suspension containing about 300 mg/L dry weight of cells. The final mixture contained about 6–10% (w/v) PVA, 0.3–0.6% (w/v) sodium alginate, and 150–250 mg/L of active microorganisms. The mixture was then added drop-wise into a solution of sodium nitrate (50% w/v) and calcium chloride ($CaCl_2$) (1% w/v) and immersed for 1 hour to form PVA-sodium nitrate beads.

The main advantages of the above two synthesis methods for making silica gel and PVA beads are as follows:
1. Beads are made at ambient temperature and neutral pH condition, which does not harm the active cells during the synthesis of the gel beads;
2. The two gels offer good mechanical strength and durability for use in membrane precipitators and reactors;
3. The gels are non-toxic to microorganisms;
4. The beads do not agglomerate after synthesis and hence can be easily mixed in liquid phase systems; and
5. The solution used for gelation of the gel, such as sodium nitrate and calcium chloride are also non-toxic to microorganisms.

Experiments were conducted with these gel beads, about 0.5–2 mm in diameter, for reducing metal sulfates in acid mine drainage into insoluble metal sulfides. A membrane precipitator was assembled using a 2 liter volume glass reactor, as shown in FIG. 4. The reactor consisted of 300 mL total volume of 0.5 mm gel beads, and acid mine drainage was added resulting in a total volume of 1.5 liters. Membrane fibers 162 were immersed in the membrane precipitator, through which a mixture of hydrogen and carbon dioxide was passed. The gel beads enabled sulfate to diffuse into the gel and is then converted by the active SRBs, encapsulated inside the gel beads, to form sulfide. This sulfide then diffuses out of the gel bead and reacts with the metal ions in acid mine drainage to form insoluble metal sulfides. The hydrogen and carbon dioxides introduced through the membrane fibers, dissolved in the water and diffused into the gel beads. The main advantages of using the gel beads were as follows:
1. The gel beads made it possible to maintain a high concentration of active SRBs inside the reactor-precipitator system, thereby accelerating the reducing reaction;
2. The gel beads protected the active SRBs from the low pH acid mine drainage;
3. The metal precipitation of metal sulfides occurred outside the beads and outside the membrane hollow fibers, thereby preventing fouling of the membranes that occurred when using the membrane precipitator described in this application; and
4. The metal precipitates were easily settled from the liquid, indicating that they were larger in size than the precipitates created by bubbling hydrogen sulfide through acid mine drainage.

Two sets of experiments were conducted:
1. Experiments with precipitating pure metal sulfides from acid mine drainage by conducting the experiments at selected pHs; and
2. Experiments with precipitating all the metal sulfides in one single step, where the purity of metal sulfide precipitates was not important.

If the objective is to produce pure metal precipitates with the intention of recycling the metals, and the metal sulfate concentrations of the desired metals in the acid mine drainage are significant, the former strategy can be used to obtain pure metal sulfides. However, if the objective is to produce treated water for discharge and the metal sulfate concentrations in acid mine drainage are low, then the latter strategy may be adopted.

Figure 8:
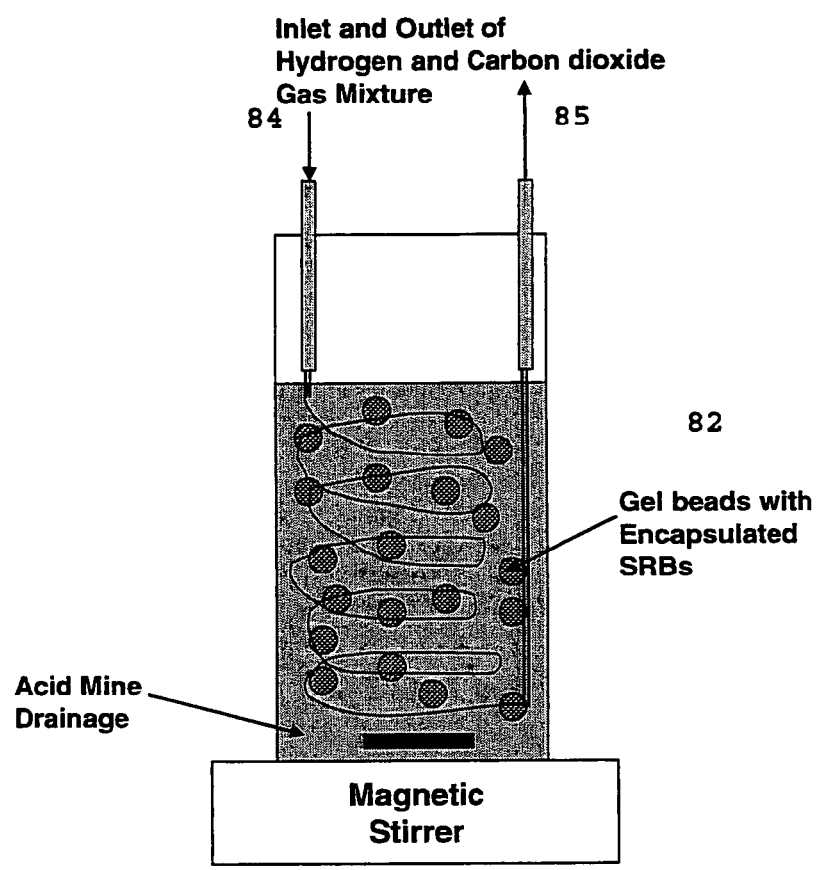
FIG. 8 Schematic of the membrane bioreactor with sulfate reducing bacteria (SRBs) encapsulated in gel beads.

Sequential batch experiments were conducted with 2-L reactors, as shown in FIG. 8. This includes an inlet 84 for $H_2$ and $CO_2$ and an outlet 85 for $H_2$ and $CO_2$. The membrane includes gel beads with in capsulated SRBs 82. 1.5 L of acid mine drainage, obtained from the Berkeley Pit, was added with 300 mL of total volume gel beads. This acid mine water was drawn from a depth of 200 ft in the Berkeley Pit and all of the iron present was in ferrous ($Fe^{+2}$) form. A mixture of silica gel beads and PVA gel beads were used, to check the stability of the bead materials in the presence of acid mine drainage. No attempts were made to compare the performance of the two different gel beads in this study. The pHs used in each step of this batch experiment were as follows:
1. Initial pH of acid mine drainage, which was 2.3.
2. After the precipitation of the first metal sulfide, the pH was increased to 4.0, by adding sodium hydroxide;
3. After the precipitation of the second metal sulfide, the pH was increased to 6.0 by adding more sodium hydroxide.

The system was operated at each selected pH for about 1 hour and the metal sulfide precipitates were filtered out after each step. The gel beads were not changed at any intermediate step. A gas mixture of 50% hydrogen and 50% carbon dioxide was passed through the hollow fiber immersed inside the batch reactor.

The following results were obtained:

Step #1: pH of 2.3, which was the initial pH of the acid mine drainage.

The metal sulfide precipitate obtained was mainly copper sulfide with a purity of 95% with 5% of zinc sulfide. All of the copper sulfate in the acid water was precipitated.

Step #2: pH of 4.0.

The metal sulfide precipitate was 99% zinc sulfide and all of remaining zinc sulfate was precipitated from the water in this step. There was no other metal sulfide produced.

Step #3: pH of 6.0

The metal sulfide precipitate was 85% ferrous sulfide with 15% aluminum hydroxide. All of the iron was precipitated in this step.

This experiment showed the feasibility of using gel beads with membranes to precipitate metal sulfides from acid mine drainage.

Finally, an experiment was conducted at pH of 8.0, using a new charge of acid mine water. After 3 hours of mixing the beads with the acid mine drainage, and passing the hydrogen-carbon dioxide gas mixture through the hollow fiber, 99.9% of all of the metals present were precipitated as a mixture, indicating the feasibility of producing treated water using this kind of system. The only metal remaining in the water was manganese, which would have precipitated completely at a slightly elevated pH.

II. Application of Membranes for Biological Sulfate Reduction

EXPERIMENT 5

Membrane Bioreactor Studies

In the precipitation schemes described in section 0088, a standard laboratory hydrogen sulfide gas was used. This experiment demonstrates that this hydrogen sulfide gas mixture can be generated using a membrane reactor utilizing sulfate reducing bacteria to remove sulfate from AMD (or other waste waters containing sulfate) to produce hydrogen sulfide gas. The water that results after removal of the metals by precipitation will contain excess sulfate and is suitable for processing by the membrane reactor system.

Sulfate reduction to hydrogen sulfide gas can be achieved in a conventional stirred tank or packed reactor, using sulfate reducing bacteria (SRE) species, or in a membrane reactor. Bioreactors can be operated either with an organic source, such as acetate, or a gaseous mixture of hydrogen and carbon dioxide. The species of SRB that use organic nutrient sources, such as acetate, are different from those that use hydrogen and carbon dioxide gas mixture.

Studies have shown that, for large systems, it is more expensive to employ sulfate reducing bacteria that utilize acetate or other organic sources than those that utilize a gaseous mixture of hydrogen and carbon dioxide, which can be obtained by steam reforming of natural gas. Since acetates and most organics useful in this process are liquids, they can be simply added to the sulfate contaminated feed water, and membrane systems are not necessary. However, when a gaseous mixture of hydrogen and carbon dioxide is used in an SRB reactor, the use of a membrane system can offer distinct advantages.

In this study, a novel membrane bioreactor system was used to biologically reduce sulfate to hydrogen sulfide gas, which can then be used to precipitate the metals from acid mine drainage. Membrane reactors have been used in a variety of applications, including waste water treatment, chemical processing, and air pollution control (Govind and Itho, 1989).

Existing technologies for using a hydrogen and carbon dioxide gas mixture for sulfate reduction using hydrogen utilizing SRB is based upon the use of gas sparged reactors (DuPreez et al., 1991). The gas mixture is bubbled through the reactor liquid, with the liquid bubbles rising through the liquid containing active sulfate reducing bacteria. The gases dissolve and diffuse to the active cells, resulting in the formation of sulfides. Since hydrogen is rather insoluble in water, the unreacted gases exiting the reactor are re-pressurized and recycled.

The main disadvantages of the sparged gas reactor system are as follows:
1. Because hydrogen gas has a very low solubility in water, a tall sorption tower is required to provide the mass transfer area required for a minimal hydrogen sorption because of the low solubility of hydrogen in water.
2. The sorption is so limited even with the use of a tall sorption tower that a large hydrogen gas mixture recycle is required to maximize hydrogen utilization.
3. These factors result in a substantial gas-phase pressure drop, which in turn requires the use of large recycle gas compressors to recover and return the hydrogen to the sorption tower.
4. Managing hydrogen gas compression for recycle to the sorption tower introduces safety issues.
5. Because of mass transfer limitations, sparged gas reactors have significantly higher volume than membrane reactors, and the operating costs of sparged reactors is higher compared to membrane systems mainly due to gas recompression and recycle costs.

Membrane reactors have been used in a variety of applications, including wastewater treatment, chemical processing and air pollution control (Itoh, 1989). (Membrane reactor technology, Rakesh Govind and Naotsugu Itoh, editors AIChE Symposium Series, American Institute of Chemical Engineers, 1989). Recent literature provides information on the use of membrane bioreactors in wastewater treatment, and in biological sulfate removal as alternative systems of conventional bioreactors (Govind et al., Report to EPA on "Studies on Metal Recovery from Acid Mine Drainage and Production of Useful Products, Part 3: Membrane Reactor Studies, 2003). In these studies, experimental data are reported on the use of biofilms in the membrane bioreactors where the biofilms are attached to the membranes and actually grow in the pores of the membranes.

In a recent publication (Tabak et al., 2004), a membrane reactor was used to achieve biological sulfate reduction. This membrane reactor had the following major disadvantage:

The attached biofilms exhibited washout at moderate Reynolds Number. At higher liquid flow rates, liquid shear resulted in removing the attached biofilm from the membrane surface, and a decrease in performance. At lower flow rates, the biofilm remained attached to the membrane, and superior performance was observed.

EXPERIMENT 6

Larger Scale Membrane System

Figure 9:
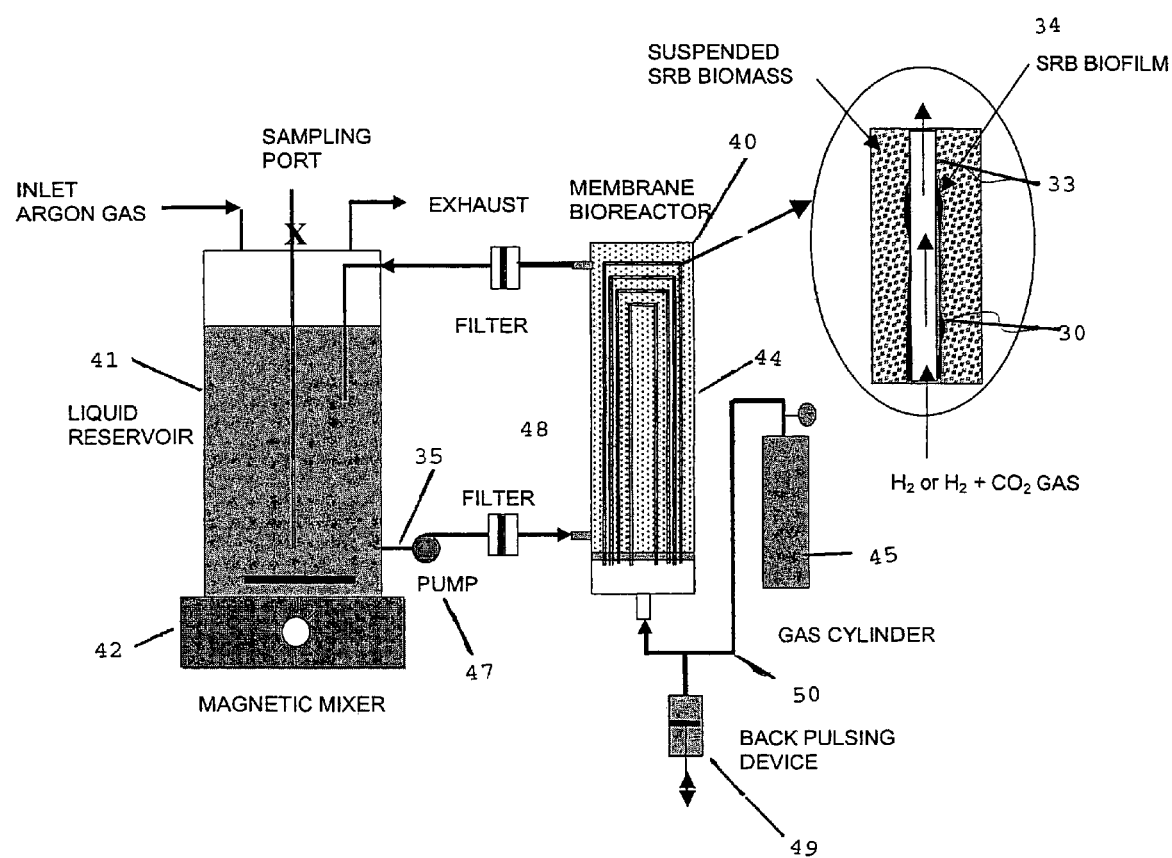
FIG. 9 Schematic of the membrane bioreactor with back pulsing system to prevent membrane pore clogging.

A larger scale membrane module (40) was purchased and assembled as shown in FIG. 9. This system included a liquid reservoir (41) for the metal-free wastewater, which liquid reservoir was placed onto a magnetic stirrer (42). Argon gas was introduced at the top of the liquid reservoir to prevent oxidation of the metals by air. Wastewater was removed from the liquid reservoir by a pump (47) through a membrane filter (48) to a membrane reactor (44). Hydrogen and carbon dioxide were introduced to the membrane reactor from a gas cylinder (45). Further characteristics of this module are shown in Table 8.

TABLE 8

Specifications of the larger scale membrane module.

| | |
|---|---|
| Shell diameter | 50.8 mm |
| Shell height | 165 mm |
| Fiber diameter | 0.1 mm |
| Number of fibers/shell | 600 |
| Surface area per module | 0.557 sq. meter |

Figure 10:
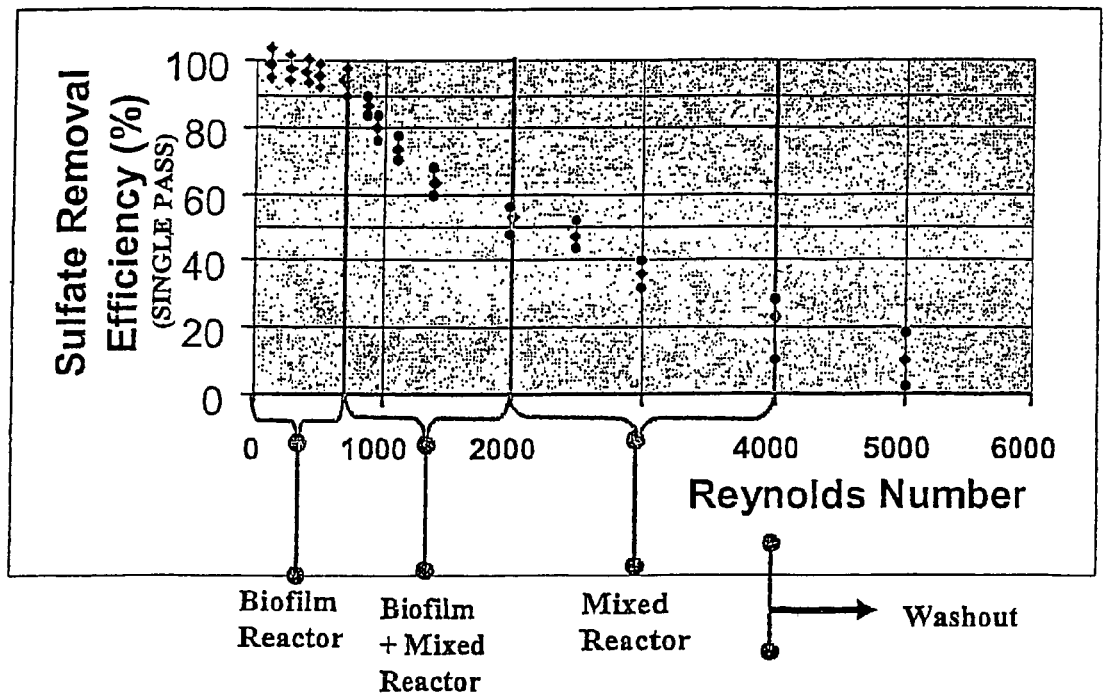
FIG. 10 Comparison of sulfate removal efficiency under different operating regimes of the membrane bioreactor. These operating regimes are biofilm reactor, biofilm+mixed reactor and mixed reactor.

The hollow fiber module was operated at various liquid Reynolds numbers by varying the liquid flow rate. FIG. 10 shows the effect of Reynolds number on the efficiency of sulfate reduction. It can readily be seen that at a Reynolds number less than 500, the membrane bioreactor behaves as a biofilm system, wherein the biofilms are retained on the outside surface of the hollow fibers within the module. However, as the Reynolds number increases, which occurs when the liquid flow rate through the shell side of the membrane module is increased beyond the critical velocity, the biofilm begins to slough off, resulting in a combination of a biofilm and mixed reactor, wherein the active biomass is to some extent present as a biofilm outside the hollow fibers as well as suspended in the shell side liquid. As the Reynolds number is increased further, the system behaves as a mixed reactor.

Figure 11:
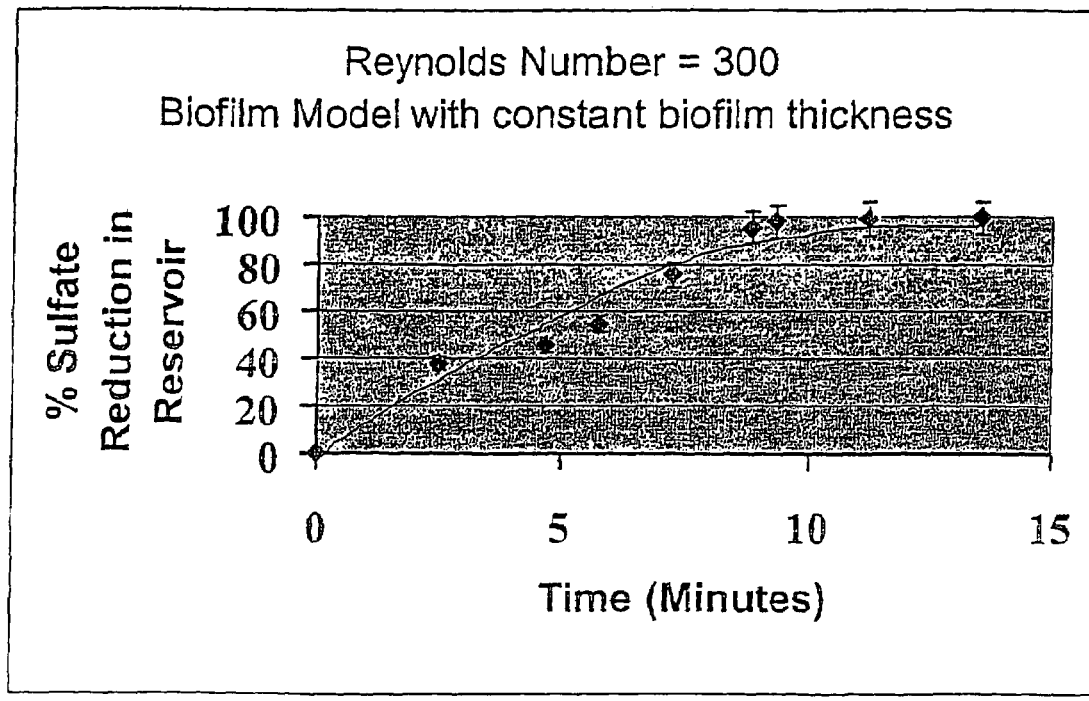
FIG. 11 Percent sulfate reduction as a function of time in a membrane bioreactor operating under the biofilm reactor operating regime.

At yet higher flow rates, significant amount of biomass is washed out of the membrane reactor and is removed by the external filter. The removal efficiency of sulfate declines as the membrane reactor changes from a biofilm system to a mixed reactor system. The performance of the membrane reactor at a Reynolds number of 300 is shown in FIG. 11. As time increases, the efficiency of sulfate removal by conversion to hydrogen sulfide increases, until all the sulfate in the reservoir is converted to sulfide.

The use of a membrane reactor system, shown in FIG. 9, overcomes the problems involved in using gas-sparged reactors and previously studied membrane reactors.

The main advantages of this new membrane reactor system are as follows:

1. The microporous membrane surface (30) presents a very large surface area to the liquid phase, resulting in high mass fluxes, compared to the surface area of the much larger rising gas bubbles in the sparged reactor system.
2. Hydrogen sulfide gas is formed outside the membrane and hence does not mix with the pressurized gas inside the hollow fibers, as shown in FIG. 9, so that there is no contamination of the hydrogen sulfide gas with carbon dioxide gas present on the membrane side, while the hydrogen sulfide is produced on the shell or liquid side, which is outside the membrane (32).
3. There is no requirement for a gas recycle compressor, which is a major advantage in particular because of the safety issues concerned with hydrogen gas compression.
4. The gel beads provide a suitable support for immobilization of active SRB, preventing the problem of clogging biofilms on the membrane surface. The concentration of active SRB present as biofilms is substantially greater than the concentration that can be achieved in suspended culture gas-sparged reactors, resulting in substantially higher sulfate reduction rates. These type of method to prevent membrane fouling can also be used in conventional wastewater treatment systems for reducing soluble BOD in wastewater.
5. Use of encapsulated bacteria prevents washout problems associated with suspended culture reactors and previously operated membrane reactors.
6. The investment and operating cost projected for the reactor are significantly lower than for a tall liquid-phase sparged reactor system.

EXPERIMENT 7

Membrane Reactor with Encapsulated SRBs

As described in previous experiments with metal precipitation using gel beads and membranes, the same apparatus can also be used in a bioreactor configuration to reduce sulfate solution to hydrogen sulfide gas, which can be then used to precipitate the metal sulfides from acid mine drainage. Experiments were conducted using the silica and PVA gel beads to quantitate the reaction rates in such a membrane reactor system. Sulfate reduction can be performed by using either soluble organic substrates, such as acetate, alcohols, etc. or by using hydrogen consuming SRBs. The main issue with hydrogen consuming SRBs is the low aqueous solubility of hydrogen in water.

Experimental data obtained in the lab shows the following characteristics of gel bead membrane reactors:

1. The sulfate reduction rates are at least 3–10 times higher, mainly due to higher concentration of SRBs in the encapsulated gel bead systems when compared with suspended cultures of SRBs;
2. The problem of washout of the active cultures of SRBs from the reactor system is eliminated using gel bead encapsulated SRBs; and
3. The SRBs are protected from the outside harsh environment, such as low pH, as in the case of acid mine waters.

Encapsulated bacteria using the gel beads can be used for many other applications:

1. Improve the performance of existing compost/soil biofilters for treating emission of odors and volatile organics;
2. Nitrification of waters containing ammonia; in nitrification the ammonia is converted to nitrate in water;
3. Denitrification of nitrate in water to nitrogen gas;
4. Treatment of trichloroethylene in groundwater;
5. Improvement of activated sludge wastewater treatment system by putting the beads into the aeration basins; and
6. Enhancing the operation of any biological treatment system, whether it is for air, water, soil or sediments.

Back-Pulsing to Prevent Membrane Fouling

Back-pulsing has been found effective in preventing excess accumulation of biomass outside the membrane hollow fibers when the module is operated as a biofilm system with a liquid Reynolds number less than 500. Back-pulsing can be achieved by using a cylinder and piston arrangement, which is attached to the inlet gas flow line of the membrane module. By moving the piston, the gas pressure inside the hollow fibers be increased or decreased.

When the pressure is increased inside the hollow fibers, the liquid present in the membrane pores is pushed out, which causes the excess biofilm to slough off of the fibers. However, since it is desirable to maintain a biofilm outside the hollow fibers, a low frequency and low amplitude pressure pulse is used to remove only the excess biomass and leave a thin active biofilm on the membrane surface.

Experimental studies were conducted on achieving sulfate reduction using a polypropylene hollow fiber membrane reactor system using hydrogen-consuming SRB. Master culture reactor studies showed that hydrogen-consuming SRB could be cultured from anaerobic digested sludges. The nutrient medium used was adequate for growing hydrogen consuming SRB, and biokinetic studies showed that the yield of the bacterial culture was very low. Membrane reactor studies conducted using the hydrogen-consuming SRB showed that the reactor is capable of reducing sulfate efficiently in a short residence time.

III. Studies on Metal Sulfide Precipitation

Studies on Settling of Colloidal Iron Polysulfide

The present invention provides a chemical treatment process for environmental clean up of acidic concentrations of ferrous ions from the open Berkeley Pit mine waters. This process involves the quantitative conversion of ferrous sulfate to a filtererable and non-colloidal ferrous monosulfide.

Precipitation followed by clean separation of ferrous sulfide during environmental separation procedures of the Berkeley Pit waters has been difficult to achieve because of the undesirable formation of non-filterable, colloidal ferrous polysulfides. These particles are often produced by the reaction of sulfide ions upon the acidic waters of the Berkeley Pit with reagents such as hydrogen sulfide, sodium sulfide, or sodium hydrosulfide that are added to precipitate acidic ferrous sulfate at a certain pH using the sequential separation procedures used for metal ions.

These colloidal particles are problematical even when other heavy metals such as copper and zinc sulfides are removed quantitatively at different pHs. Colloidal particles such as those formed as $FeS_x$ (where x is greater than one) are difficult to isolate for purification if they are gelatinous and minute. After washing and drying, analysis revealed the presence of $FeS_x$, which formulation suggests the presence of 12.8 sulfur atoms to one ferrous atom. The desired formulation is an iron to sulfur ratio of one. The present invention solves this problem.

Experimental

The acid mine water treated was an acidic (pH about 2.2), metal-bearing wastewater generated by the aqueous oxidation of metallic sulfides (FeS) by the action of certain bacteria in active and abandoned mining operations. Sodium sulfide and sodium hydrosulfide as well as the positive "counter ions" of quaternary ammonium halides, such as cetyl trimethyl ammonium chloride, cetyl pyridinium bromide, benzal alkonium chloride, and mixed alkyl trimethyl ammonium chloride were purchased from Aldrich. Ferrous salts were purchased from Fisher Scientific.

Precipitation of Colloids

The colloidal material was determined to be negative at the interfacial surfaces. Its negativity was established by addition of positive "counter ions", such as those produced by benzal alkonium chloride, dodecyl trimethyl ammonium chloride, cetyl pyridinium bromide, and mixed alkyl trimethyl ammonium bromide.

When tested individually, the counter ions effected the rapid precipitation of the suspended colloidal particles. Experimentally, 25 mg of each of the above positive counter ion quaternary ammonium halides was added to each vial containing 20 grams of Berkeley Pit mine waste waters having suspended ferrous polysulfide molecules. Addition of the above first-named counter ion induced precipitation within 10 second. However, the resulting precipitated colloids with positive ions were not crystalline. It should be noted that an essential characteristic of these particles is that they must be crystalline in order to provide facile separation and purification of the ferrous sulfide compounds.

Remediation of Berkeley Pit Pyrites with Potassium Nitrite

A volume of 500 mL of Berkeley Pit mine waste water was used, containing 471 mg/L of ferrous ions, equivalent to 8,4 millimoles of ferrous ions/L. To this amount was added 2.016 grams (10 millimoles) of sodium sulfide monohydrate along with 71.4 mg of potassium nitrite.

To 500 mL (4.2 millimoles of ferrous ions) of acid mine water (from which zinc, copper and aluminum ions were removed) were added 71.4 mg (0.84 millimoles) of potassium nitrite and 2.08 g (10 millimoles of $Nas.9H_2O$), as well as 3.8 ml t-butyl cresol. The $KNO_2$ was added in one portion along with the aqueous solution of di-t-butyl cresol. The reaction was run for 40 minutes at 45° C., during which time the NaS $9H_2O$ was added in small increments. Heating and stirring were discontinued. No phase separation nor precipitation was noted for one hour. The potassium nitrite (0.8 millimole) showed no beneficial effect under the operating conditions used, as the filtration was slow and settling time took several hours. This reaction required several hours for two distinct phases to be noticeable in the flask filled with nitrogen and an anti-oxidant. The iron to sulfur ratio was 1:1.9, suggesting the formation of polysulfide in the mixture.

Remediation of Ferrous Pyrites with Sodium Sulfite

Ten millimolar percent equivalent of sodium sulfite proved to be highly effective in remediating iron pyrite. The remediation treatment by sodium sulfite was conducted as follows: To the above reaction Berkeley Pit Pyrites were added 10 mole percent of 8.4 millimolar of sulfite ions in 15 mL of water, and the sulfite was added in ten portions over the one hour period at 55° C. Stirring and heating were terminated. This reaction displayed two distinct phases within about fifteen minutes. From this reaction, 1.078 grams of black precipitate was obtained.

Analysis shows:

| | | |
|---|---|---|
| 223 ± 0.6 mg/L | 53.6 ± 0.47 mg/L | (A) |
| 223 ± 1.7 mg/L | 52.7 ± 0.93 mg/L | |
| 223 ± 1.15 mg/L (average) | 53.15 ± 7 mg/L (average) | |

Thus potassium nitrite ($KNO_2$) by itself, does not seem effective under conditions used in preparing a rapidly-settling precipitate, ferrous sulfide; while the addition of 10 millimolar percent of sodium sulfite appears to be highly effective as shown below:

The analysis of iron to sulfur ratio can be reduced as follows:

$$\frac{223}{55.85} \quad \frac{53.15}{32.06}$$

$$\frac{Fe}{3.9928} \quad \frac{S}{1.6578}$$

When the above numbers are divided by their respective atomic weights to find milliequivalents of iron and sulfur and simplified to their lowest common denominator in the ratio, the iron to sulfur ratio was 2.41:1, indicating that polysulfides were not formed.

Remediation During Preparation

As stated by Secor (Chem. Rev.), some degree of selective crystallization of one desirable form of crystals may be induced to form by the introduction of selected crystals. Into a one liter round bottom flask with three necks was introduced 450 mL of doubly distilled water. Then, 13.8997 grams (0.05 mole) of ferrous heptahydrate was introduced into the flask followed by the addition of 211 mg of black ferrous sulfide. Heat was applied to raise the temperature of the contents of the flask to 38° C. The reaction was discontinued after 45 minutes, at which time stirring and heating were discontinued. After 12 minutes, two clean phases were noted, indicating conversion of a polysulfide to the monosulfide.

Precipitation of Iron as Ferrous Monosulfide and its Conversion to Iron Products The ratio of iron to sulfur is calculated to be approximately 1.0 showing the absence of ferrous polysulfide, and the presence of ferrous monosulfide, as shown in Table 9.

TABLE 9

| Iron F = | Sulfur | (B) |
|---|---|---|
| 602 mg/L | 343 | |
| 594 mg/L | 341 | |
| 609 mg/L | 344 | |
| 601 mg/L Average | 342.6 mg/L Average | |

Iron is equal to 601 mg/l/55.85 mg/l=10.76

Sulfur is equal to 342.6 mg/l/32.02 mg/l=10.70

Since the Berkeley Pit's acid mine drainage contains large amounts of iron in the form of ferrous sulfate, experiments were conducted on converting this ferrous sulfate, once precipitated as ferrous sulfide, into iron products, such as alpha-Goethite, alpha-magnetite, etc. Synthesis procedures that had been earlier followed for converting pure ferrous sulfate to alpha-goethite and magnetite were applied to the ferrous precipitation obtained from the acid mine drainage. A major problem encountered was the slow dissolution rate of ferrous sulfide obtained from the precipitation strategies discussed above. Even in the presence of strong acids, only small amounts of ferrous sulfides can be reacted and dissolved as ferrous ions.

The reaction of hydrogen sulfide with ferrous sulfate occurs according to the following equation:

$Fe^{2+} + H_2S \rightleftharpoons FeS + 2H^+$

This reaction is reversible, and when a high partial pressure of hydrogen sulfide gas is present, the dissolution of ferrous sulfide to from ferrous ions does not occur, even with strong acids.

When hydrogen sulfide is bubbled through acid mine drainage, since both iron and sulfur can exist in multiple oxidation states, iron polysulfides ($FeS_x$) are formed during precipitation. The presence of excess sulfide results in further reaction between ferrous monosulfide and sulfide to form iron polysulfides. Iron polysulfides are insoluble in most acids, nitric acid being the exception, and the rate of dissolution of iron polysulfides to form ferrous ions is very slow. This poses a major problem in forming iron products from the iron polysulfide precipitates formed in the precipitation processes disclosed above.

Studies on Dissolution of Iron Polysulfide Precipitates

Before using ferrous sulfide produced from Berkeley Pit water, granular, reagent-grade ferrous sulfide was used to determine feasibility. Initially, the desired concentration was a 0.40 mol/L ferrous solution (T. Wang et al., 1998) and a volume of 700 mL. The ferrous sulfide was added to the water-filled reactor maintained at 40° C. The solution turned a cloudy gray color because some particles became suspended in solution.

A stoichiometric amount of sulfuric acid was added while argon was bubbled through the reactor. Reaction occurred, as evidenced by the odor of hydrogen sulfide gas. However, the reaction did not proceed to a high conversion rate because most particles never dissolved. Thus, more acid was added. Each successive addition of acid slightly increased conversion, but complete dissolution was never achieved. In this experiment, a total of 160 mL of concentrated sulfuric acid (12N) was added to 6.1 grams of ferrous sulfide and reacted for 24 hours.

In addition to using concentrated sulfuric acid, both concentrated hydrochloride and nitric acids were tried as reactants. Small amounts of ferrous sulfide were placed into a 40 mL vial. Excess acid was added and the mixture was brought to a boil. Even under these extreme conditions, the ferrous sulfide did not completely react, and it left a porous black solid.

Experiments were conducted on dissolving the precipitated iron sulfide using oxidizing agents. Initially, 15% by weight hydrogen peroxide solutions were added to a mixture of iron polysulfide and 1M nitric acid. However, the dissolution reaction was slow and resulted in the formation of some iron oxides as follows:

$FeS_x + H_2O_2 \longrightarrow Fe_2O_3 + H_2SO_4$

However, when a commercial oxidizing agent, Paratene SHP™ (Woodrising Resources, Ltd., Calgary, Albert), which is a mixture of hydrogen peroxide and a stabilizer, was used, rapid dissolution of the precipitated ferrous polysulfide was obtained. The effect of the stabilizer in hydrogen peroxide prevents the hydrogen peroxide from decomposing in the presence of metal ions, which allows more hydrogen peroxide to react with the iron sulfides. Further, Paratene SHP™ immobilizes the iron as an acid soluble salt, and prevents further oxidation of the iron with hydrogen peroxide to form iron oxides, as was the case with hydrogen peroxide alone.

Two hundred mg of iron polysulfide precipitated from Berkeley Pit acid mine drainage using hydrogen sulfide gas in the precipitation experiment was mixed with 5 g of Paratene SHP™ diluted with water in a ratio of 1:1. The solution was heated to 40° C. and continuously stirred using a magnetic mixer. Complete dissolution of iron polysulfides occurred in about one hour of mixing, indicating that all of the polysulfide had reacted to form a stable solution of ferrous iron. One N sulfuric acid was then added to obtain a clear solution of ferrous sulfate. Similar results were also obtained with commercially produced iron sulfide or pyrites.

The advantages of using iron sulfide precipitated with hydrogen sulfide gas, rather than the ferrous sulfate solution obtained from acid mine drainage are:

1. The volumetric flow rate of acid mine drainage through the precipitation process does not affect the conversion process of ferrous polysulfide, since this step is conducted after the iron polysulfide precipitate is removed from the precipitation system;
2. the time taken for the iron polysulfide to react with the oxidizing agent solution does not affect the precipitation process; and
3. no oxidizing chemicals need be added to acid mine drainage, which can result in not only increasing chemical costs significantly, but also results in oxidizing manganese ions present in solution, forming a manganese oxide precipitate during precipitation of iron product. Since the flow rate of acid mine drainage can be quite large (3 to 5 million gallons per day in the case of the Berkeley Pit), the cost of adding any oxidizing agents to this flow can be prohibitively expensive, and result in impure precipitate.

Conversion of Ferrous Sulfate Solution from Acid Mine Drainage to Iron Products

Despite the disadvantages of converting ferrous sulfate solution obtained from acid mine drainage directly into iron products, this option was investigated. This approach may be particularly desirable when the flow rate of the acidic metal-bearing waste stream is not large and the concentration of manganese ions is small.

Goethite and magnetite are iron products that have been used commercially as pigments as well as for other products. When ferrous solutions are slowly oxidized by air bubbling, one or several of the following products may form: goethite (alpha-FeOOH), lepidocrocite (gamma-FeOOH), magnetite ($Fe_3O_4$) and hematite (alpha-$Fe_2O_3$). Rapid oxidation using hydrogen peroxide leads to the precipitation of feroxyhyte (delta-FeOOH) [Frini et al., 1997].

Goethite is of particular interest, primarily because of its use as a precursor for synthesizing acicular iron pigments needed in magnetic recording media [Pozas et al., 2002]. Goethite is the alpha phase of iron oxyhydroxide and is produced both synthetically and naturally. Goethite varies in color from yellow to dark brown, but the color by transmitted light is often blood red. It crystallizes in the orthorhombic system, with a Mohs hardness of about 5–5.5 and a specific gravity of about 4–4.4 [Tottle, 1984]. Goethite is chemically identical to lepidocrocite and pyrosiderite, differing only in crystalline structure.

Goethite has been successfully synthesized in the laboratory from both ferrous and ferric solutions. Schwertmann described a method by which pure goethite is synthesized from ferrous iron as follows: 9.9 g of unoxidized crystals of $FeCl_2.9H_2O$ was dissolved in one liter of deionized water. The ferrous solution was held in a wide-mouth two liter bottle. To the ferrous iron solution was added 100 mL of 1.0M $NaHCO_3$. Then the solution was aerated at a flow rate of between thirty and forty cubic centimeters per minute. Oxidation of the ferrous iron was complete after 48 hours. The pH of the solution was maintained around seven by buffering with $NaHCO_3$. Both the ferrous iron solution and the sodium bicarbonate solution should be sparged with nitrogen gas to remove any dissolved oxygen prior to reaction (Schwertmann et al., 2000).

In addition to preparation from a ferrous iron solution, goethite may be produced directly from a basic ferric iron solution. Boehm described a method by which goethite is produced from $Fe(NO_3)_3$. One hundred mL of 1.0M ferric nitrate solution was poured into a two liter polyethylene flask. To this solution, 180 mL of 5M KOH solution was added rapidly with stirring. The resulting solution was immediately diluted to two liters with twice distilled water. The polyethylene flask was closed and held at 70° C. for 60 hours, during which time the reddish-brown solution was converted to a compact, yellow-brown precipitate of goethite. After the 60 hours, the solution was filtered and the resulting goethite filter cake was washed with twice distilled water to remove excess OH— and $NO_3$— ions (Boehm, 1925).

Additionally goethite may be synthesized from an acidic ferric solution. 283 grams of $Fe(NO_3)_3.9H_2O$ was dissolved in 350 mL of 2M $HNO_3$. This solution was diluted with 1.4 liters of distilled water to which was added 1.4 liters of 1.0 M NaOH with vigorous stirring. This yielded a final solution with hydroxide to iron ratio of approximately 2.0. The pH of the solution was between about 1.7 and 1.8. Yellow goethite began to precipitate from solution after 50 days. The solution was then filtered, and the filter cake washed (Morup et al., 1983; Schwertmann et al., 2000).

X-ray powder diffraction is a useful method for determining the crystalline composition of various iron oxides. In the powder method, the substance to be examined is reduced to a very fine powder. The sample is then placed in a holder and inserted into a beam of monochromatic x-rays. The holder is then rotated under the monochromatic x-rays, and the diffracted waves are intercepted by the detector and measured. Different crystal structure material show different peaks when collected by x-ray powder diffraction, and it is these distinct peaks at different angles that allow for the differentiation of materials. Tables 10–13 below show the peak intensity and relative peak intensity versus $2\theta$ for different types of iron oxyhydroxides and iron oxides.

The XRD Spectra described above were obtained using a Siemens Diffractometer. The two $2\theta$ values ranged from 10 to 80 at a step size of 0.5μ with a scan time of one second. The spectra obtained are compared with the values given in the tables below to determine the mineral derived.

TABLE 10

XRD Spectrum data for Goethite
α-FeOOH
Iron Oxide Hydroxide; goethite, syn (ortorhombic)

| $2\theta$ | Intensity | Relative Intensity |
|---|---|---|
| 17.821 | 131 | 13.11311 |
| 21.217 | 999 | 100 |
| 26.333 | 103 | 10.31031 |
| 33.253 | 364 | 36.43644 |
| 34.717 | 204 | 20.42042 |
| 35.495 | 44 | 4.404404 |
| 36.092 | 125 | 12.51251 |
| 36.662 | 581 | 58.15816 |
| 39.028 | 24 | 2.402402 |
| 39.987 | 91 | 9.109109 |
| 40.107 | 71 | 7.107107 |
| 41.211 | 139 | 13.91391 |
| 4a.209 | 10 | 1.001001 |
| 45.073 | 28 | 2.802803 |
| 47.31 | 47 | 4.704705 |
| 48.019 | 4 | 0.4004 |
| 49.885 | 7 | 0.700701 |
| 50.595 | 86 | 8.608609 |
| 51.52 | 20 | 2.002002 |
| 53.215 | 268 | 26.82683 |
| 54.203 | 76 | 7.607608 |
| 55.377 | 25 | 2.502503 |
| 57.395 | 52 | 5.205205 |
| 59.05 | 169 | 16.91692 |
| 59.178 | 92 | 9.209209 |
| 60.929 | 5 | 0.500501 |
| 61.326 | 77 | 7.707708 |
| 61.513 | 71 | 7.107107 |
| 62.943 | 23 | 2.302302 |

TABLE 10-continued

XRD Spectrum data for Goethite
α-FeOOH
Iron Oxide Hydroxide; goethite, syn (ortorhombic)

| 2θ | Intensity | Relative Intensity |
|---|---|---|
| -63.262 | 33 | 3.303303 |
| 64.016 | 77 | 7.707708 |
| 64.415 | 6 | 0.600601 |
| 65.667 | 41 | 4.04104 |
| 67.05 | 32 | 3.203203 |
| 67.522 | 1 | 0.1001 |
| 67.91 | 8 | 0.800801 |
| 68.417 | 29 | 2.902903 |
| 69.118 | 45 | 4.504505 |
| 69.818 | 14 | 1.401401 |
| 71.345 | 15 | 1.501502 |
| 71.574 | 50 | 5.005005 |
| 72.184 | 1 | 0.1001 |
| 73.267 | 18 | 1.801802 |
| 74.937 | 15 | 1.501502 |
| 75.128 | 13 | 1.301301 |
| 75.838 | 5 | 0.500501 |
| 76.578 | 18 | 1.801802 |
| 77.586 | 3 | 0.3003 |
| 77.954 | 2 | 0.2002 |
| 78.579 | 1 | 0.1001 |
| 79.101 | 1 | 0.1001 |
| 79.868 | 20 | 2.002002 |

TABLE 11

XRD Spectrum data for Akaganeite.
β-Fe +3 O(OH)
Iron Oxide Hydroxide; Akaganeite, syn (tetragonal)

| 2θ | Intensity | Relative Intensity | 2θ | Intensity | Relative Intensity |
|---|---|---|---|---|---|
| 11.852 | 40 | 40 | 48.905 | 4 | 4 |
| 16.804 | 30 | 30 | 50.502 | 1 | 1 |
| 23.869 | 5 | 5 | 52.092 | 15 | 15 |
| 26.747 | 100 | 100 | 52.929 | 3 | 3 |
| 34.032 | 25 | 25 | 55.135 | 1 | 1 |
| 35.191 | 55 | 55 | 55.952 | 35 | 35 |
| 36.176 | 2 | 2 | 61.153 | 9 | 9 |
| 38.201 | 9 | 9 | 61.699 | 5 | 5 |
| 39.253 | 35 | 35 | 62.334 | 3 | 3 |
| 42.993 | 7 | 7 | 62.54 | 3 | 3 |
| 43.806 | 7 | 7 | 63.857 | 1 | 1 |
| 46.474 | 20 | 20 | 64.456 | 15 | 15 |

TABLE 12

XRD Spectrum data for Lepidocrocite
γ-Fe+$^{+3}$O(OH)
Iron Oxide Hydroxide; Lepidocrocite, syn (orthorhombic)

| 2θ | Intensity | Relative Intensity | 2θ | Intensity | Relative Intensity |
|---|---|---|---|---|---|
| 14.286 | 999 | 100 | 59.652 | 38 | 3.803804 |
| 27.163 | 228 | 22.82282 | 60.513 | 42 | 4.204204 |
| 28.799 | 1 | 0.1001 | 60.921 | 91 | 9.109109 |
| 30.08 | 18 | 1.801802 | 62.528 | 18 | 1.801802 |
| 36.536 | 332 | 33.23323 | 65.487 | 53 | 5.305305 |
| 37.16 | 514 | 51.45145 | 66.156 | 8 | 0.800801 |
| 38.19 | 683 | 68.36837 | 67.546 | 19 | 1.901902 |
| 43.605 | 18 | 1.801802 | 68.756 | 74 | 7.407407 |
| 43.805 | 19 | 1.901902 | 73.191 | 65 | 6.506507 |
| 46.957 | 116 | 11.61161 | 75.239 | 6 | 0.600601 |
| 47.172 | 192 | 19.21922 | 75.706 | 1 | 0.1001 |
| 49.336 | 46 | 4.604605 | 76.882 | 7 | 0.700701 |
| 50.033 | 61 | 6.106106 | 77.647 | 4 | 0.4004 |
| 53.099 | 6 | 0.600601 | 9.176 | 22 | 2.202202 |

TABLE 12-continued

XRD Spectrum data for Lepidocrocite
γ-Fe+$^{+3}$O(OH)
Iron Oxide Hydroxide; Lepidocrocite, syn (orthorhombic)

| 2θ | Intensity | Relative Intensity | 2θ | Intensity | Relative Intensity |
|---|---|---|---|---|---|
| 56.023 | 1 | 1.10bl | 79.934 | 24 | 2.402402 |
| 56.799 | 5 | 0.500501 | | | |

TABLE 13

XRD Spectrum data for Ferrihydrite
$Fe_5O_7(OH) * 4 H_2O$
Iron Oxide Hydroxide Hydrate; Ferrihydrite (hexagonal)

| 2θ | Intensity | Relative Intensity |
|---|---|---|
| 35.922 | 100 | 100 |
| 40.832 | 80 | 80 |
| 46.323 | 80 | 80 |
| 53.258 | 50 | 50 |
| 61.4 | 70 | 70 |
| 62.784 | 80 | 80 |

Batch Experiments: Goethite from a Pure $Fe^{2+}$ System

Goethite was produced from a $Fe^{2+}$ system based on the aforementioned procedure by Schwertmann (Schwertmann et al., 2000). Approximately 13.9 g of $FeSO_4 \cdot H_2O$ was dissolved in 100 mL of deionized water through which nitrogen had been sparged for one hour to remove any dissolved oxygen. The solution was placed into a 2.0 liter Erlenmeyer flask. A solution of sodium bicarbonate was made by dissolving approximately 9.2 g of $NaHCO_3$ in 110 mL of deionized water which had previously been sparged with nitrogen gas for one hour. The sodium bicarbonate solution was then added to the ferrous sulfate solution with rapid magnetic stirring. After the sodium bicarbonate solution had been added, air was sparged through the solution at a flow rate of between 30-40 cc/minute. The flow rate of the air was monitored by a rotameter on the air line. The solution was sparged for 48 hours. A precipitate formed, and, after the aeration was complete, the solution was filtered through 1.2 micron glass fiber filter paper. The filter cake was dried, weighed, and a small portion was taken for x-ray diffraction analysis to determine if goethite was produced.

In addition, a new value called the R value is given. The R value is the ratio of the moles of bicarbonate to the moles of iron present in solution.

$$R = \frac{n_{NaHCO_3}}{n_{Fe}} = \frac{\frac{m_{NaHCO_3} MW_{NAHCO_3}}{(x_{Fe}V)}}{(1000 * MW_{FE})}$$

where:

$n_{NaHCO_3}$ is the number of moles of bicarbonate in solution (mol bicarbonate)

$n_{Fe}$ is the number of moles of iron in solution (mol iron)

$m_{NaHCO_3}$ is the mass of sodium bicarbonate added (g)

$MW_{NaHCO_3}$ is the molecular weight of sodium bicarbonate (g/mol)

$X_{Fe}$ is the concentration of iron at the time of bicarbonate addition (ppm)

V is the volume of solution (L)

$MW_{Fe}$, is the molecular weight of iron (g/mol)

Goethite was produced from solutions of $FeSO_4 \cdot 7H_2O$ with the addition of sodium bicarbonate and aeration for 48 hours. X-ray diffraction confirmed that the product was goethite. Both precipitates were a tan color.

Batch Experiments: Goethite from Berkeley Pit Acid Mine Drainage

Two approaches were investigated in attempts to make goethite from Berkeley Pit AMD. The first approach (Experiments 1–3) were conducted using raw Berkeley Pit AMD as the starting material in each and treating with the bicarbonate method of Schwertmann which involves bicarbonate addition followed by aeration (Schwertmann, et al. 2000). In the second approach, the synthesis of Goethite from green rusts formed from Berkeley Pit AMD was attempted in Experiments 4–6.

In Experiment 1, the raw (as received) Berkeley Pit AMD water was directly treated prior to the removal of any of the metals. In order to investigate the potential of improved segregation of metals, further experiments (experiments 2 and 3) were conducted after removal of copper and zinc as their corresponding metal sulfides and removal of aluminum as aluminum hydroxide. The difference between the two experiments is their R value.

Experiment 1: In this procedure one liter of Berkeley Pit AMD water was placed into a two liter Erlenmeyer flask and was aerated with nitrogen gas for one half hour to remove dissolved oxygen. The pH was approximately 2.6. Then, 1.97 g. of sodium bicarbonate was dissolved in 110 mL of deionized water through which nitrogen gas had been sparged for one half hour. The sodium bicarbonate solution was added, and aeration was begun at a flow rate of 45 cc/minute. The solution was aerated for 48 hours. Once aeration was complete, the solution was filtered through 1.2 micron glass fiber filter paper, dried, and a small sample was taken for x-ray diffraction analysis. A sample of the filtrate was collected and taken for ICAP analysis.

For experiments 2 and 3, the raw AMD was pretreated to remove the copper, zinc, and aluminum as follows. One liter of Berkeley Pit AMD was treated to adjust the pH to 4.0 with KOH in a two liter Erlenmeyer flask. At this point, the solution was sparged with a pre-made mixture of 50% hydrogen sulfide/50% carbon dioxide for one half hour in an attempt to remove the copper and zinc from the Berkeley Pit AMD as copper sulfide and zinc sulfide. After one half hour of sparging, during which the solution was stirred, the solution was filtered through 1.2 micron glass fiber filter paper into a receiving flask. A sample of the filtrate was collected and analyzed by ICAP spectrometry.

The filtrate from the copper/zinc removal precipitation stage was then treated for aluminum removal. The solution was sparged with nitrogen gas to remove any excess hydrogen sulfide and any dissolved oxygen. The pH of the solution was adjusted with KOH to approximately 5.2. The pH of the solution began to drop as the aluminum in the Berkeley Pit AMD formed aluminum hydroxide. More KOH was added to raise the pH back to 5.2. This process was continued until the pH of the solution did not drop any further. The solution was then filtered through 1.2 micron glass fiber filter paper. A sample of the filtrate was collected and taken for ICAP analysis.

The filtrate from the aluminum removal stage was then treated by the bicarbonate method of Schwertmann. An amount of sodium bicarbonate was added to the solution, and the solution was aerated at a flow rate of between 30 and 40 cc per minute (the Schwertmann method). The solution was aerated for 48 hours. Once aeration was complete, the solution was filtered through a 1.2 micron glass fiber filter paper. The filter cake was dried, and a portion was taken for x-ray diffraction analysis. A sample of the filtrate was collected for ICAP analysis.

The experimental conditions for Experiment 1 are given in Table 14. This experiment was simply the addition of sodium bicarbonate to raw Berkeley Pit AMD followed by aeration as previously described. The pH of the Berkeley Pit AMD at the start of the experiment was 2.66.

TABLE 14

Experimental Metal Concentrations: Sodium Bicarbonate Addition and Aeration to Raw Berkeley Pit AMD.

| Concentration of Iron in Solution (mg/L) | Volume of Solution (L) | Moles of Iron in solution, $n_{Fe}$ (mol NaHCO$_3$) | Moles of Bicarbonate in Solution, $n_{NaHCO3}$ (mol NaH CO$_3$) | R (mol NaHCO$_3$/ mol Fe) | Error R |
|---|---|---|---|---|---|
| 568.1 | 1.1 | 0.01 | 0.02 | 2.11 | 0.1 |

Table 15 shows the final filtrate metal concentration after addition of the sodium bicarbonate solution and aeration for 48 hours.

TABLE 15

Filtrate Metal Concentrations: Sodium Bicarbonate Addition and Aeration to Raw Berkeley Pit AMD.

| Sample Location | Sample Number | Sample Concentration, ppm | | | | |
|---|---|---|---|---|---|---|
| | | $Cu^{+2}$ | $Zn^{+2}$ | $Fe^{+2}$ | $Al^{+3}$ | $Mn^{+2}$ |
| aeration outlet | 1 | 0.1192 | 15.556 | 0.2848 | 4.460 | 153.0 |
| | 2 | 0.1284 | 16.292 | 0.3308 | 5.024 | 161.2 |
| | 3 | 0.1472 | 17.028 | 0.4080 | 5.180 | 162.2 |
| | Average | 0.13 | 16.29 | 0.34 | 4.89 | 158.8 |
| | Error | 0.01 | 0.64 | 0.05 | 0.33 | 4.4 |

As was expected, all of the metals were precipitated from solution as metal oxides. In this case, no goethite was formed, as evidenced by x-ray diffraction analysis. However, the iron product produced may have some commercial value.

Experiments 2 and 3 were then conducted using a feed to the aeration stage that was prepared using a sequential batch-wise treatment for removal of copper, zinc, and aluminum as previously described. The conditions are described in Table 16.

TABLE 16

Experimental Conditions for Experiment 2: Copper, Zinc, Aluminum Removed; Sodium Bicarbonate Addition and Aeration.

| Concentration of Iron in Solution (mg/L) | Volume of Solution (L) | Moles of Iron in solution, $n_{Fe}$ (mol NaHCO$_3$) | Moles of Bicarbonate in Solution, $n_{NaHCO3}$ (mol NaH CO$_3$) | R (mol NaHCO$_3$/ mol Fe) | Error R |
|---|---|---|---|---|---|
| 382.31 | 1.111 | 0.01 | 0.02 | 2.53 | 0.23 |

Table 17 shows the filtrate metal concentrations at the various stages of metal removal from the Berkeley Pit acid mine water for Experiment 2. The most notable aspect of this table is the finding that although all of the metals were not removed prior to aeration, the zinc and iron appeared to be co-precipitating in the aeration stage. As in Experiment 1, the aeration stage precipitate obtained from Experiment 2 showed no sign of goethite formation.

7. Filtrate Metal Concentrations for Experiment 2: Copper, Zinc, Aluminum Removed; Sodium Bicarbonate Addition and Aeration.

| Sample Location | Sample Number | Sample Concentration, ppm | | | | |
|---|---|---|---|---|---|---|
| | | $Cu^{+2}$ | $Zn^{+2}$ | $Fe^{+2}$ | $Al^{+3}$ | $Mn^{+2}$ |
| Cu/Zn Precipitator Filtrate | 1 | BDL | 343.88 | 325.08 | 180.80 | 139.80 |
| | 2 | 0.015 | 365.28 | 337.60 | 190.08 | 145.28 |
| | 3 | 0.034 | 372.68 | 340.28 | 192.76 | 146.04 |
| | Average | 0.02 | 360.61 | 334.32 | 187.88 | 143.71 |
| | Error | 0.02 | 12.95 | 7.03 | 5.44 | 2.95 |
| Al Precipitator Filtrate | 1 | BDL | 403.2 | 375.24 | 23.54 | 167.4 |
| | 2 | BDL | — | — | — | — |
| | 3 | BDL | 435.2 | 389.36 | 25.14 | 173.4 |
| | Average | 0.00 | 419.2 | 382.30 | 24.34 | 170.4 |
| | Error | 0.00 | — | — | — | — |
| Aeration Filtrate | 1 | BDL | 1.382 | 0.2896 | 4.756 | 10.144 |
| | 2 | BDL | — | — | — | — |
| | 3 | BDL | 1.566 | 0.3000 | 5.288 | 10.480 |
| | Average | 0.00 | 1.474 | 0.2948 | 5.022 | 10.312 |
| | Error | 0.00 | 1.211 | 0.2408 | 4.118 | 8.423 |

Experiment 3—This experiment repeats the procedure of Experiment 2. Table 18 shows the experimental conditions for the Experiment. Table 19 shows the filtrate metal concentrations at the various stages of removal from the Berkeley Pit AMD for Experiment 3. The R value is determined from the concentration of iron in the aluminum filtrate.

TABLE 18

Experimental Conditions for Experiment 3: Copper, Zinc, Aluminum Removed; Sodium Bicarbonate Addition and Aeration.

| Concentration of Iron in Solution (mg/L) | Volume of Solution (L) | Moles of Iron in solution, $n_{Fe}$ (mol NaHCO$_3$) | Moles of Bicarbonate in Solution, $n_{NaHCO3}$ (mol NaH CO$_3$) | R (mol NaHCO$_3$/ mol Fe) | Error R |
|---|---|---|---|---|---|
| 305.37 | 1.366 | 0.01 | 0.02 | 3.16 | 0.001 |

TABLE 19

Filtrate Metal Concentrations for Experiment 3: Copper, Zinc, Aluminum Removed: Sodium Bicarbonate Addition and Aeration.

| Sample Location | Sample Number | Sample Concentration, ppm | | | | |
|---|---|---|---|---|---|---|
| | | $Cu^{+2}$ | $Zn^{+2}$ | $Fe^2$ | $Al^{+3}$ | $Mn^{+2}$ |
| Cu/Zn Precipitator Filtrate | 1 | BDL | 3.775 | 323.56 | 197.64 | 152.08 |
| | 2 | BDL | 3.959 | 338.96 | 208.76 | 159.16 |
| | 3 | BDL | 4.328 | 340.76 | 210.2 | 159.96 |
| | Average | 0.00 | 4.020 | 343.43 | 205.53 | 156.93 |
| | Error | 0.00 | 0.240 | 8.19 | 5.95 | 3.64 |
| Al Precipitator Filtrate | 1 | BDL | 5.156 | 299.20 | 18.784 | 137.40 |
| | 2 | BDL | 5.524 | 310.64 | 20.008 | 142.60 |
| | 3 | BDL | 5.524 | 306.28 | 19.784 | 140.28 |
| | Average | 0.00 | 5.400 | 305.37 | 19.510 | 140.09 |
| | Error | 0.00 | 0.180 | 5.00 | 0.560 | 2.29 |
| Aeration Filtrate | 1 | BDL | 3.407 | 1.7812 | 6.556 | 138.52 |
| | 2 | BDL | 3.683 | 1.5652 | 6.868 | 140.40 |
| | 3 | BDL | 3.867 | 1.6372 | 7.092 | 141.08 |
| | Average | 0.00 | 3.650 | 1.6600 | 6.840 | 140.00 |
| | Error | 0.00 | | | | |

The most notable aspect of the above table is the fact that although all of the metals are not removed prior to aeration, the zinc and the iron appeared to co-precipitate upon aeration. This behavior was the same as in Experiment 2.

Batch Experiments: Goethite from Berkeley Pit AMD Green Rusts (Experiments 4, 5, and 6).

Green rust is a term used to described $Fe^{2+}=Fe^{3+}$ hydroxide salts appearance in the equilibrium state. When these salts are in solution, they dissociate into their cation salt and $Fe^{2+}$ and $Fe^{3+}$ hydroxides. There was an attempt to produce green rust from the Berkeley Pit AMD as a precursor to goethite. One liter of Berkeley Pit AMD as added to a two liter Erlenmeyer flask, and the pH was adjusted to 4.0 with KOH. At this point, the solution was sparged with a premade mixture of 50% hydrogen sulfide/50% carbon dioxide gas for one half hour in an attempt to remove the copper and zinc from the Berkeley Pit AMD was copper sulfide and zinc sulfide. After one hour of sparging, during which the solution was magnetically stirred, the solution was filtered through 1.2 micron glass fiber filter paper. A sample of the filtrate was collected and taken for ICAP analysis.

The filtrate from the copper/zinc removal precipitate stage was then re-administered into a clean and dry two liter Erlenmeyer flask. The solution was sparged with nitrogen gas to remove any excess hydrogen sulfide and any dissolved oxygen. The pH of the solution was adjusted with KOH to approximately 5.2. As aluminum hydroxide was formed, the pH of the solution began to drop, therefore continual additions of KOH were required to maintain the pH in the pH range of about 5.2. At the conclusion of the reaction, the solution was then filtered through glass fiber filter paper. A sample of the filtrate was collected and taken for ICAP analysis.

The concentrations of metal species in solution were analyzed using an ICAP spectrometer. Liquid samples were filtered through a 0.22 micrometer membrane filter to remove solids and diluted by 25 percent with concentrated nitric acid to avoid precipitation of metals from changes in pH.

Table 20 shows the experimental conditions for Experiment 4. The R value is determined from the iron concentration in the aluminum precipitation filtrate.

TABLE 20

Experimental Conditions for Experiment 4: Copper, Zinc, Aluminum Removed; Sodium Bicarbonate Addition and Aeration.

| Concentration of Iron in Solution (mg/L) | Volume of Solution (L) | Moles of Iron in solution, $n_{Fe}$ (mol NaHCO$_3$) | Moles of Bicarbonate in Solution, $n_{NaHCO3}$ (mol NaH CO$_3$) | R (mol NaHCO$_3$/ mol Fe) | Error R |
|---|---|---|---|---|---|
| 301.43 | 1.1781 | 0.01 | 0.02 | 3.20 | 0.0 |

Table 21 shows the filtrate metal concentrations at the various stages or removal from the Berkeley Pit AMD for EXP4AMD. The most notable aspect of Table 21 is that though all of the metals are not removed prior to aeration, the zinc and iron appeared to be co-precipitating. The was the same phenomenon observed with Experiments 1, 2, and 3.

The aeration stage precipitate obtained from EXP4AMD showed no sign of goethite formation.

TABLE 21

Filtrate Metal Concentrations for Experiment 4: Copper, Zinc, Aluminum Removed, Green Rust Formed, Sodium Bicarbonate Addition and Aeration.

| Sample Location | Sample Number | Sample Concentration, ppm | | | | |
|---|---|---|---|---|---|---|
| | | $Cu^{+2}$ | $Zn^{+2}$ | $Fe^{+2}$ | $Al^{+3}$ | $Mn^{+2}$ |
| Cu/Zn Precipitator Filtrate | 1 | BDL | 376.0 | 156.96 | 227.60 | 178.12 |
| | 2 | BDL | 381.0 | 156.64 | 229.80 | 177.02 |
| | 3 | BDL | 397.2 | 160.64 | 236.96 | 181.44 |
| | Average | 0.00 | 385.8 | 158.08 | 231.45 | 178.87 |
| | Error | 0.00 | 9.6 | 1.92 | 4.24 | 1.99 |
| Al Precipitator Filtrate | 1 | BDL | 361.6 | 299.24 | 22.522 | 195.60 |
| | 2 | BDL | 371.1 | 300.12 | 22.716 | 195.04 |
| | 3 | BDL | 380.9 | 304.92 | 23.248 | 198.08 |
| | Average | 0.00 | 371.2 | 301.43 | 22.840 | 196.24 |
| | Error | 0.00 | 8.4 | 2.65 | 0.32 | 1.40 |
| Aeration Filtrate | 1 | BDL | 2.0892 | 0.6824 | 4.408 | 44.16 |
| | 2 | BDL | 2.1764 | 0.6980 | 4.524 | 44.84 |
| | 3 | BDL | 2.1764 | 0.7292 | 4.576 | 45.40 |
| | Average | 0.00 | 2.1500 | 0.70 | 4.500 | 44.80 |
| | Error | 0.00 | 0.04 | 0.02 | 0.07 | 0.54 |

Table 22 shows the experimental conditions for Experiment 5. The R value is determined from the iron concentration in the aluminum precipitation filtrate.

TABLE 22

Experimental Conditions for Experiment 5: Copper, Zinc, Aluminum Removed, Green Rust Formed, Sodium Bicarbonate Addition and Aeration.

| Concentration of Iron in Solution (mg/L) | Volume of Solution (L) | Moles of Iron in solution, $n_{Fe}$ (mol NaHCO$_3$) | Moles of Bicarbonate in Solution, $n_{NaHCO3}$ (mol NaH CO$_3$) | R (mol NaHCO$_3$/ mol Fe) | Error R |
|---|---|---|---|---|---|
| 328.48 | 1.187 | 0.01 | 0.02 | 2.48 | 0.02 |

Table 23 shows the filtrate metal concentrations at the various stages of removal from the Berkeley Pit AMD for Experiment 5. The most notable aspect of Table 23 is the fact that, although all of the metals are not removed prior to aeration, the zinc and iron appear to co-precipitate. This is the same behavior as was observed in Experiments 1 through 4.

TABLE 23

Filtrate Metal Concentrations for Experiment 5: Copper, Zinc, Aluminum Removed, Green Rust Formed, Sodium Bicarbonate Addition and Aeration.

| Sample Location | Sample Number | Cu$^{+2}$ | Zn$^{+2}$ | Fe$^{+2}$ | Al$^{+3}$ | Mn$^{+2}$ |
|---|---|---|---|---|---|---|
| Cu/Zn Precipitator Filtrate | 1 | BDL | 236.16 | 331.32 | 244.48 | 188.16 |
| | 2 | BDL | 246.40 | 337.20 | 252.28 | 190.52 |
| | 3 | BDL | 250.00 | 337.44 | 253.16 | 190.4 |
| | Average | 0.00 | 244.19 | 335.32 | 249.97 | 189.69 |
| | Error | 0.00 | 6.22 | 3.00 | 4.14 | 1.15 |
| Al Precipitator Filtrate | 1 | BDL | 180.40 | 324.76 | 10.724 | 166.04 |
| | 2 | BDL | 185.92 | 326.40 | 10.896 | 166.24 |
| | 3 | BDL | 191.92 | 334.28 | 11.260 | 169.6 |
| | Average | 0.00 | 186.08 | 328.48 | 10.960 | 167.29 |
| | Error | 0.00 | 4.99 | 4.41 | 0.24 | 1.73 |
| Aeration Filtrate | 1 | BDL | 1.1328 | 0.5108 | 4.156 | 57.44 |
| | 2 | BDL | 0.9588 | 0.5056 | 4.184 | 58 |
| | 3 | BDL | 1.1328 | 0.5160 | 4.192 | 58.92 |
| | Average | 0.00 | 1.07 | 0.5100 | 4.18 | 58.12 |
| | Error | 0.00 | 0.09 | 0.00 | 0.02 | 0.65 |

Table 24 shows the experimental conditions for Experiment 6. The R value is determined from the iron concentration in the aluminum precipitation filtrate.

TABLE 24

Experimental Conditions for Experiment 6: Copper, Zinc, Aluminum Removed, Green Rust Formed, Sodium Bicarbonate Addition and Aeration.

| Concentration of Iron in Solution (mg/L) | Volume of Solution (L) | Moles of Iron in solution, $n_{Fe}$ (mol NaHCO$_3$) | Moles of Bicarbonate in Solution, $n_{NaHCO3}$ (mol NaH CO$_3$) | R (mol NaHCO$_3$/ mol Fe) | Error R |
|---|---|---|---|---|---|
| 267.96 | 1.1984 | 0.01 | 0.03 | 5.88 | 0.03 |

Table 25 shows the filtrate metal concentration at the various stages of removal from the Berkeley Pit AMD for Experiment 6. Even though all of the metals are not removed prior to aeration, the zinc and iron appeared to co-precipitate, as was noted in all of the experiments conducted previously (Experiments 1–5, above). The precipitate obtained from the aeration stage in Experiment 6 showed no sign of goethite formation.

TABLE 25

Filtrate Metal Concentrations for Experiment 6: Copper, Zinc, Aluminum Removed, Green Rust Formed, Sodium Bicarbonate Addition and Aeration.

| Sample Location | Sample Number | Cu$^{+2}$ | Zn$^{+2}$ | Fe$^{+2}$ | Al$^{+3}$ | Mn$^{+2}$ |
|---|---|---|---|---|---|---|
| Cu/Zn Precipitator Filtrate | 1 | BDL | 293.76 | 279.16 | 228.6 | 180.4 |
| | 2 | BDL | 300.24 | 283.84 | 232.08 | 183.2 |
| | 3 | BDL | 301.4 | 286.08 | 233.88 | 184.16 |
| | Average | 0.00 | 298.47 | 283.03 | 231.52 | 182.59 |
| | Error | 0.00 | 3.57 | 3.06 | 2.32 | 1.69 |
| Al Precipitator Filtrate | 1 | BDL | 228 | 264.92 | 6.872 | 166.12 |
| | 2 | BDL | 229.64 | 267.48 | 6.908 | 167.6 |
| | 3 | BDL | 235.56 | 271.48 | 7.204 | 169.88 |
| | Average | 0.00 | 231.07 | 267.96 | 6.99 | 167.87 |
| | Error | 0.00 | 3.44 | 2.86 | 0.16 | 1.64 |
| Aeration Filtrate | 1 | BDL | 0.0892 | 0.048 | 2.7964 | 1.2172 |
| | 2 | BDL | 0.0892 | 0.066 | 2.8616 | 1.2304 |
| | 3 | BDL | 0.0892 | 0.0844 | 2.8616 | 1.2432 |
| | Average | 0.00 | 0.09 | 0.05 | 2.84 | 1.23 |
| | Error | 0.00 | 0.00 | 0.03 | 0.03 | 0.01 |

Analysis of Precipitate Crystals Obtained from AMD

Experiments were also conducted on ferrous sulfate solutions, obtained from AMD, beginning with a Berkeley Pit AMD solution obtained from a deeper section of water within the Berkeley Pit. This AMD has a significantly higher concentration of ferrous sulfate and less than 10 ppm of ferric sulfate.

Two experiments were conducted at 39° C. The first experiment was conducted using an aluminum settler effluent containing 677 ppm Fe. The second experiment was conducted using an aluminum settler effluent containing 620 ppm Fe. Because of the low level of ferric relative to ferrous iron, it was assumed that the iron present in solution was entirely ferrous ions. The initial rector volume of 700 mL was degassed at reaction temperature for one hour with nitrogen. At time t=0, 17 mL of nitrogen-degassed, 1N sodium hydroxide solution was added, producing an Fe2/ OH— ratio ranging from 0.50 and 0.41 for the 677 ppm and 620 ppm solutions, respectively. Air was then bubbled into the reactor at approximately 30 mL per minute for one hour. After one hour, the solutions were drained from the reactor and filtered. The filtrate from both reactions was orange in color and non-magnetic.

For these two experiments, samples were taken from the reactor to measure the ferrous conversion. A 5 mL sample was removed from the sample port using a syringe. This sample was then added to 20 mL of dilute sulfuric acid and mixed. Because the solubility product of goethite is approximately 10–44 (T. Wang et al., 1998), converted ferrous ion can be filtered using a 0.2 micron filter. During the reaction, a yellow solid was retained on the filter. The filtrate was then analyzed to determine the concentration of un-reacted iron in the system, from which the reaction conversion is calculated. Table 26 shows the iron concentration at various time increments for the two experiments. The low conversion and amorphous nature of the product obtained indicated that acicular goethite was not produced.

Several experiments were conducted at 60° C. The initial iron concentration of the aluminum settler effluent for these experiments was 625 ppm. Table 27 gives the conditions used for each experiment.

TABLE 26

Iron Concentration at Various Times (Berkeley Pit Oxidation at 39° C.).

| Time (minutes) | Total Iron in solution | Time (minutes) | Total Iron in solution |
|---|---|---|---|
| 0.0 | 677.2 | 0.0 | 620.3 |
| 6.0 | 674.2 | 6.0 | 631.5 |
| 13.5 | 660.5 | 12.0 | 615.3 |
| 21.0 | 659.2 | 18.0 | 613.1 |
| 27.5 | 604.6 | 30.0 | 576.4 |
| 34.5 | 528.7 | 36.0 | 507.4 |
| 41.0 | 478.6 | 42.0 | 525.3 |
| 47.0 | 540.9 | 48.0 | 550.9 |
| 53.5 | 509.4 | 54.0 | 354.1 |

TABLE 27

Initial Conditions for Conversion of Ferrous in Berkeley Pit water to Goethite at 60° C.

| Experiment | 7.4.1 | 7.4.2 | 7.4.3 | 7.4.4 |
|---|---|---|---|---|
| Reactor Volume | 700 | 620 | 700 | 700 |
| Concentration of Base Solution | 1.01 | 1.01 | 1.14 | 1.14 |
| Base Added | 2.1 | 3.9 | 1.8 | 7.7 |
| $[Fe^{2+}]/[OH^-]$ value | 3.70 | 1.76 | 3.83 | 0.90 |

First, the reactor was filled with aluminum settler effluent (the overflow) and heated to reaction temperature while degassing with argon. This process took one hour to complete. After this first hour, sodium hydroxide solution was added, and the solution was mixed under argon at a flow rate of approximately 100 mL/minute for one more hour. Then, air was bubbled through the mixture for two hours at a rate that varied between 100 and 200 mL/minute. The solutions were drained from the reactor, allowed to cool, and filtered using a 1.2 micron filter.

For all experiments, two distinctly colored solids were visible. The greatest portion of the solids produced was gelatinous and colored orange. However, a few milligrams of a yellow solid were also visible.

Domingo et al. discuss the effect of chloride ions in solution. According to their research, goethite is formed in solutions containing both sulfate and chloride ions; however, the particles formed are spherical. According to the CRC Handbook of Chemistry and Physics (Lide, 1990), ferric oxide ($Fe_2O_3$) is reddish-brown, amorphous and gelatinous. This description matches the solids obtained above.

It is to be understood that the phraseology or terminology employed herein is for the purpose of description and not of limitation. The means and materials for carrying out disclosed functions may take a variety of alternative forms without departing from the invention. Thus, the expressions "means to . . . " and "means for . . . " as may be found the specification above, and/or in the claims below, followed by a functional statement, are intended to define and cover whatever structural, physical, chemical, or electrical element or structures which may now or in the future exist for carrying out the recited function, whether or not precisely equivalent to the embodiment or embodiments disclosed in the specification above, and it is intended that such expressions be given their broadest interpretation.

REFERENCES

Adams, D. "Did Toxic Stew Cook the Goose?" *High Country News,* 27 (23), Dec. 11, 1995.

Allen, J., R. Govind, R. Scharp, H. Tabak and F. Bishop. "Metal Recovery and Reuse from Acid Mine Drainage." Presented at the 1999 AIChE Annual Meeting, Technical Program, November 1999. Unpublished.

Baltpurvins, K. A., R. C. Burns, and G. A. Lawrance. "Heavy Metals in Wastewater: Modelling the Hydroxide Precipitation of Copper (II) from Wastewater Using Lime as the Precipitant." *Waste Management,* 16 (8), 717–725, 1996.

Bhattacharyya, D., A. B. Jumawan, G. Sun, C. Sund-Hagelberg, and K. Schwitzgebel. "Precipitation of Heavy Metals with Sodium Sulfide: Bench-Scale and Full-Scale Experimental Results." *AIChE Symposium Series,* 77 (209), 31–38 (1981).

Bhattacharyya, D., A. B. Jumawan, Jr., and R. B. Grieves. "Separation of Toxic Heavy Metals by Sulfide Precipitation." *Separation Science and Technology.* 14 (5), 441–452 (1979).

Bird, R. B., W. E. Stewart, and E. N. Lightfoot. *Transport Phenomena.* Wiley, New York, 192, 559 (1960).

Box, G. E. P., W. G. Hunter, and J. S. Hunter. *Statistics for Experimenters.* Wiley and Sons, New York, 209 (1978).

de Nevers, N. *Fluid Mechanics for Chemical Engineers.* $2^{nd}$ Ed. McGraw-Hill, New York, 225 (1991).

Domingo, C., R. Rodriguez-Clemente, and M. Blesa. "Morphological Properties of α-FeOOH, α-FeOOH, and $Fe_3O_4$ Obtained by Oxidation of Aqueous Fe(II) Solutions." *Journal of Colloid and Interface Science,* 165, 244–252 (1994).

Dufour, J., L. Lopez, A. Formoso, C Negro, R. Latorre, and F. Lopez-Mateos. "Mathematical Model of A-Goethite Synthesis by Oxyprecipitation of Steel Pickling Liquors." *The Chemical Engineering Journal.* 59, 287–291 (1995).

DuPreez, L. A. du, J. P. Odendaal, J. P. Maree, and M. Ponsonby. "Biological Removal of Sulphate from Industrial Effluents Using Producer Gas As an Energy Source." *Environmental Technology,* 13, 875

Dvorak, D. H., R. S. Hedin, H. M. Edenborn, and P. E. McIntire. "Treatment of Metal-Contaminated Water Using Bacterial Sulfate Reduction: Results from Pilot-Scale Reactors." *Biotechnology and Bioengineering,* 40, 609–616 (1992).

Govind R & Itoh N (1989) Membrane reactor technology AIChE Symposium Series, American Institute of Chemical Engineers, New York, N.Y.

Govind R, Rao P & Tabak H H (2000) Membrane reactor studies for treatment of acid mine drainage. U.S. EPA Report, National Risk Management Research Laboratory, ORD, Cincinnati, Ohio Sep. 30, 2000 pp. 85

Govind, R., U. Kumar, R. Puligadda, J. Antia, and H. Tabak. "Biorecovery of Metals from Acid Mine Drainage." *Emerging Technologies in Hazardous Waste Management,* 7, 91–101, 1997.

Maree, J. P. and W. F. Strydom. "Biological Sulphate Removal from Industrial Effluent in an Upflow Packed Bed Reactor." *Water Research,* 21 (2), 141–146, 1987.

Maree, J. P., A. Gerber, and E. Hill. "An Integrated Process for Biological Treatment of Sulfate-Containing Industrial Effluents." *Journal—Water Pollution Control Federation,* 59 (12), 1069–1074, 1987.

Monhemius, A. J. "Precipitation Diagrams for Metal Hydroxides, Sulphides, Arsenates, and Phosphates." *Institution of Mining and Metallurgy,* Vol. C, 202–206 (1977).

Morse, J. W., F. J. Millero, J. C. Cornwell, and D. Rickard. "The Chemistry of the Hydrogen Sulfide and Iron Sulfide Systems in Natural Waters." *Earth-Science Reviews,* 24, 1–42 (1987).

O'Connor, D., M. Dudukovic, and P. Ramachandran. "Formation of A-Goethite ($\alpha$-FeOOH) through the Oxidation of a Ferrous Hydroxide Slurry." *Industrial Engineering and Chemistry Research,* 31, 2516–2524 (1992).

Oktaybas, C., E. Acma, C. Arslan, and O. Addemir. "Kinetics of Copper Precipitation by $H_2S$ from Sulfate Solutions." *Hydrometallurgy,* 35, 129–137 (1994).

Oxtoby, D. W. and N. H. Nactrieb. *Principles of Modern Chemistry.* $2^{nd}$ Ed. Saunders College Publishing, Philadelphia, 258–259 (1990).

Pankhania M, Stephenson T & Semmens M J (1994) Hollow fibre bioreactor for wastewater using bubbleless membrane aeration Water Res. 28: 10 2233–2236

Sada, E., H. Kumazawa, and H.-M. Cho. "Absorption of Oxygen into Aqueous Alkaline Suspensions of Ferrous Hydroxide Leading to Formation of Extremely Fine Goethite and Magnetite Particles." *Chemical Engineering Communications.* 95, 145–151 (1990a).

Sada, E., H. Kumazawa, and H.-M. Cho. "Absorption of Oxygen into Aqueous Alkaline Suspensions of Ferrous Hydroxide Leading to Formation of Extremely Fine Goethite and Magnetite Particles." *Chemical Engineering Communications.* 95, 145–151 (1990a).

Sada, E., H. Kumazawa, and H.-M. Cho. "Formation of Magnetite Fine Particles by Chemical Absorption into Aqueous Suspensions of Ferrous Hydroxide." *Chemical Engineering Communications,* 75, 89–99 (1989).

Sada, E., H. Kumazawa, and H.-M. Cho. "Formation of Fine Magnetic Particles by Oxidation of Aqueous Suspensions of Ferrous Hydroxide." *Canadian Journal of Chemical Engineering,* 68, 622–626 (1990b).

Tuttle, J. H., P. R. Dugan, and C. I. Randles. "Microbial Sulfate Reduction and Its Potential Utility as an Acid Mine Water Pollution Abatement Procedure." *Applied Microbiology,* 17 (2), 297–302, 1969.

Walpole, R. E. and R. H. Myers. *Probability and Statistics for Engineers and Scientists.* $5^{th}$ Ed. Macmillan Publishing Co., New York, 262, 320–321 (1993).

Wang, W. *Studies on Sulfate Reducing Bacteria (SRB) for Treatment of Acid Mine Drainage.* Master of Science (chemical engineering), University of Cincinnati, 85–99, 1998.

What is claimed is:

1. A method for removing at least one of metals and sulfates from acidic wastewaters, for recovering metals and for producing water suitable for discharge, comprising:
   (a) precipitating each metal in the wastewater in a separate stage comprising maintaining the Eh and adding an aqueous solution of a hydroxide to maintain the pH in a range for effective formation of precipitates sequentially in the following order of removal: copper, ferric iron, zinc, aluminum, ferrous iron and manganese;
   (b) introducing gas containing hydrogen sulfide into the wastewater into the stages in which copper, zinc, ferrous iron and manganese are removed;
   (c) adding an aqueous solution of a hydroxide at a suitable concentration to precipitate ferric hydroxide and aluminum hydroxide in their appropriate order;
   (d) recovering the metal precipitated at each stage individually or as mixtures as a precipitate selected from the group consisting of cupric sulfide, ferric hydroxide, zinc sulfide, aluminum hydroxide, ferrous sulfide, and manganese sulfide, to produce a metal-free sulfate containing water;
   (e) treating the ferrous sulfide with an oxidizing agent to convert the ferrous sulfide to iron products selected from the group consisting of goethite, magnetite, hematite, lipidocrocite, and feroxyhyte;
   (f) treating the metal-free sulfate-containing water in a hydrogen utilizing sulfate reducing bacteria (SRB) bioreactor to convert the sulfate to hydrogen sulfide, and removing and recovering the hydrogen sulfide for re-use in the metal precipitation stages, wherein excess hydrogen sulfide is recovered.

2. The method according to claim 1 wherein the method is a batch process.

3. The method according to claim 1 wherein the method is a continuous process.

4. The method according to claim 1 wherein the oxidizing agent is a mixture of hydrogen peroxide and a stabilizer for hydrogen peroxide.

5. The method according to claim 1 wherein the bioreactor contains silica gel beads containing an encapsulated bacterial suspension that are made by a process comprising:
   (a) adding bacteria, sodium alginate and distilled water to a colloidal silica solution to form a mixture and maintaining the pH of the mixture between about 6 and about 7;
   (b) dropping the mixture into a 5% calcium chloride aqueous solution to form silica gel beads;
   (c) curing the silica gel beads in the mixture.

6. The method according to claim 1 wherein the bioreactor contains polyvinyl alcohol gel beads containing an encapsulated bacterial suspension that are made by a process comprising:
   (a) mixing polyvinyl alcohol, sodium alginate and distilled water and heating the mixtures until all material is dissolved to form a homogeneous mixture;

(b) cooling the mixture and adding a bacterial suspension;

(c) adding the mixture from (b) to a solution of sodium nitrate and calcium chloride to form polyvinyl alcohol sodium nitrate gel beads.

7. The method according to claim 1 wherein the cupric sulfide is precipitated at a pS of from 10 to 15 and an Eh of from −100 to −120 mV.

8. The method according to claim 1 wherein ferric hydroxide is precipitated at a pS of less than 2 with nitrogen gas sparging.

9. The method according to claim 1 wherein zinc sulfide is precipitated at a pS of from 10 to 15 and an Eh of from −100 to −120 mV.

10. The method according to claim 1 wherein ferrous sulfide is precipitated at a pS of from 5 to 8 and an Eh of from −180 to −200 mV.

11. The method according to claim 1 wherein manganese sulfide is precipitated at a pS of from 10 to 15 and an Eh of from −100 to −120 mV.

12. The method according to claim 1 wherein all metals are recovered together in step (d) as mixtures of the metals.

13. The method according to claim 1 wherein the bioreactor contains silica gel beads or polyvinyl alcohol gel beads containing alginate and an encapsulated bacterial suspension.

14. The method according to claim 1 wherein the bioreactor comprises a hollow fiber membrane.

15. A process for reducing sulfates in metal-free wastewater comprising contacting the wastewater in a membrane bioreactor comprising sulfate reducing bacteria and alginate encapsulated within polyvinyl alcohol gel beads or silica gel beads, to reduce the sulfates to hydrogen sulfide.

* * * * *